United States Patent
Gudmundson et al.

(10) Patent No.: US 8,494,210 B2
(45) Date of Patent: Jul. 23, 2013

(54) USER INTERFACE FOR USE IN SECURITY SCREENING PROVIDING IMAGE ENHANCEMENT CAPABILITIES AND APPARATUS FOR IMPLEMENTING SAME

(75) Inventors: Dan Gudmundson, Québec (CA); Luc Perron, Charlesbourg (CA)

(73) Assignee: Optosecurity Inc., Quebec, Quebec (CA)

( * ) Notice: Subject to any disclaimer, the term of this patent is extended or adjusted under 35 U.S.C. 154(b) by 1408 days.

(21) Appl. No.: 11/694,338

(22) Filed: Mar. 30, 2007

(65) Prior Publication Data

US 2008/0240578 A1    Oct. 2, 2008

(51) Int. Cl.
G06K 9/00    (2006.01)

(52) U.S. Cl.
USPC ............................. 382/100; 382/282; 378/57

(58) Field of Classification Search
USPC ................. 382/100, 141, 254, 282, 217, 224, 382/101; 378/57
See application file for complete search history.

(56) References Cited

U.S. PATENT DOCUMENTS

| | | |
|---|---|---|
| 4,338,626 A | 7/1982 | Lemelson |
| 4,379,348 A | 4/1983 | Haas et al. |
| 4,383,327 A | 5/1983 | Kruger |
| 4,470,303 A | 9/1984 | O'Donnell |
| 4,480,899 A | 11/1984 | Sprague |
| 4,481,575 A | 11/1984 | Bazlen et al. |
| 4,482,958 A | 11/1984 | Nakayama et al. |
| 4,509,075 A | 4/1985 | Simms et al. |
| 4,573,198 A | 2/1986 | Anderson |
| 4,612,666 A | 9/1986 | King |
| 4,637,056 A | 1/1987 | Sherman et al. |
| 4,651,957 A | 3/1987 | Minnich, II |
| 4,653,109 A | 3/1987 | Lemelson et al. |
| 4,722,096 A | 1/1988 | Dietrich et al. |

(Continued)

FOREIGN PATENT DOCUMENTS

| | | |
|---|---|---|
| CA | 2307439 | 5/2000 |
| CA | 2319958 | 9/2000 |

(Continued)

OTHER PUBLICATIONS

PCT/CA2005/000716 (IPRP), Nov. 13, 2007, OptoSecurity Inc.

(Continued)

*Primary Examiner* — Aaron W Carter

(57) ABSTRACT

An apparatus, method and system for facilitating visual identification of a prohibited object in an image during security screening are provided. Data derived from an apparatus that scans the receptacle with penetrating radiation conveying an image of the contents of a receptacle is received. Information from an automated threat detection processor is also received and indicates an area of interest in the image potentially containing a prohibited object. The image is then processed to generate an enhanced image. In a first example, portions of the enhanced image outside the area of interest are visually de-emphasized. In a second example, features appearing inside the area of interest are visually emphasized. The enhanced image is then displayed on a display device. Optionally, thumbnail images associated with previously screened receptacles are displayed and a user is enabled to select one or more thumbnail images. An enhanced image corresponding to the selected thumbnail image is then displayed. In alternative implementations, an apparatus, method and system for use in screening a person for facilitating visual identification of a prohibited object thereon is provided.

29 Claims, 15 Drawing Sheets

U.S. PATENT DOCUMENTS

| | | |
|---|---|---|
| 4,724,543 A | 2/1988 | Klevecz et al. |
| 4,725,733 A | 2/1988 | Horman et al. |
| 4,736,399 A | 4/1988 | Okazaki |
| 4,736,401 A | 4/1988 | Donges et al. |
| 4,737,650 A | 4/1988 | West |
| 4,756,015 A | 7/1988 | Doenges et al. |
| 4,759,047 A | 7/1988 | Donges et al. |
| 4,775,895 A | 10/1988 | Traupe et al. |
| 4,783,794 A | 11/1988 | Dietrich |
| 4,788,704 A | 11/1988 | Donges et al. |
| 4,795,253 A | 1/1989 | Sandridge et al. |
| 4,819,188 A | 4/1989 | Matsubara et al. |
| 4,832,447 A | 5/1989 | Javidi |
| 4,837,733 A | 6/1989 | Shiraishi et al. |
| 4,838,644 A | 6/1989 | Ochoa et al. |
| 4,841,554 A | 6/1989 | Doenges et al. |
| 4,849,912 A | 7/1989 | Leberl et al. |
| 4,862,358 A | 8/1989 | Kimura et al. |
| 4,869,574 A | 9/1989 | Hartman |
| 4,870,670 A | 9/1989 | Geus |
| 4,884,289 A | 11/1989 | Glockmann et al. |
| 4,887,899 A | 12/1989 | Hung |
| 4,916,722 A | 4/1990 | Ema |
| 4,955,060 A | 9/1990 | Katsuki et al. |
| 5,003,616 A | 3/1991 | Orita et al. |
| 5,018,178 A | 5/1991 | Katsumata |
| 5,020,111 A | 5/1991 | Weber |
| 5,022,062 A | 6/1991 | Annis |
| 5,034,812 A | 7/1991 | Rawlings |
| 5,041,993 A | 8/1991 | Rawlings |
| 5,056,130 A | 10/1991 | Engel |
| 5,060,249 A | 10/1991 | Eisen et al. |
| 5,063,602 A | 11/1991 | Peppers et al. |
| 5,065,418 A | 11/1991 | Bermbach et al. |
| 5,073,782 A | 12/1991 | Huguenin et al. |
| 5,079,698 A | 1/1992 | Grenier et al. |
| 5,091,924 A | 2/1992 | Bermbach et al. |
| 5,107,351 A | 4/1992 | Leib et al. |
| 5,109,276 A | 4/1992 | Nudelman et al. |
| 5,132,811 A | 7/1992 | Iwaki et al. |
| 5,132,842 A | 7/1992 | Yeh |
| 5,132,998 A | 7/1992 | Tsutsui et al. |
| 5,138,167 A | 8/1992 | Barnes |
| 5,150,229 A | 9/1992 | Takesue et al. |
| 5,179,581 A | 1/1993 | Annis |
| 5,181,234 A | 1/1993 | Smith |
| 5,198,669 A | 3/1993 | Namiki et al. |
| 5,216,541 A | 6/1993 | Takesue et al. |
| 5,239,595 A | 8/1993 | Takemura et al. |
| 5,243,693 A | 9/1993 | Maron |
| 5,257,085 A | 10/1993 | Ulich et al. |
| 5,257,322 A | 10/1993 | Matsuoka et al. |
| 5,268,967 A | 12/1993 | Jang et al. |
| 5,283,641 A | 2/1994 | Lemelson |
| 5,297,222 A | 3/1994 | Mori et al. |
| 5,309,244 A | 5/1994 | Katagiri et al. |
| 5,309,523 A | 5/1994 | Iwaki et al. |
| 5,311,359 A | 5/1994 | Lucas et al. |
| 5,319,547 A | 6/1994 | Krug et al. |
| 5,323,472 A | 6/1994 | Falk |
| 5,327,286 A | 7/1994 | Sampsell et al. |
| 5,345,081 A | 9/1994 | Rogers |
| 5,345,173 A | 9/1994 | Bito et al. |
| 5,365,560 A | 11/1994 | Tam |
| 5,365,564 A | 11/1994 | Yashida et al. |
| 5,367,552 A | 11/1994 | Peschmann |
| 5,371,542 A | 12/1994 | Pauli et al. |
| 5,375,156 A | 12/1994 | Kuo-Petravic et al. |
| 5,376,796 A | 12/1994 | Chan et al. |
| 5,379,334 A | 1/1995 | Zimmer et al. |
| 5,379,336 A | 1/1995 | Kramer et al. |
| 5,418,380 A | 5/1995 | Simon et al. |
| 5,420,788 A | 5/1995 | Vissers |
| 5,425,113 A | 6/1995 | Ito |
| 5,428,657 A | 6/1995 | Papanicolopoulos et al. |
| 5,430,787 A | 7/1995 | Norton |
| 5,481,584 A | 1/1996 | Tang et al. |
| 5,481,622 A | 1/1996 | Gerhardt et al. |
| 5,483,569 A | 1/1996 | Annis |
| 5,485,312 A | 1/1996 | Horner et al. |
| 5,490,218 A | 2/1996 | Krug et al. |
| 5,493,444 A | 2/1996 | Khoury et al. |
| 5,506,880 A | 4/1996 | Scardino et al. |
| 5,519,225 A | 5/1996 | Mohr et al. |
| 5,524,133 A | 6/1996 | Neale et al. |
| 5,528,702 A | 6/1996 | Mitsuoka et al. |
| 5,528,703 A | 6/1996 | Lee |
| 5,546,189 A | 8/1996 | Svetkoff et al. |
| 5,568,256 A | 10/1996 | Korner et al. |
| 5,580,471 A | 12/1996 | Fukumoto et al. |
| 5,595,767 A | 1/1997 | Cinquin et al. |
| 5,600,303 A | 2/1997 | Husseiny et al. |
| 5,600,485 A | 2/1997 | Iwaki et al. |
| 5,600,700 A | 2/1997 | Krug et al. |
| 5,604,634 A | 2/1997 | Khoury et al. |
| 5,619,596 A | 4/1997 | Iwaki et al. |
| 5,625,192 A | 4/1997 | Oda et al. |
| 5,625,717 A | 4/1997 | Hashimoto et al. |
| 5,638,420 A | 6/1997 | Armistead |
| 5,642,393 A | 6/1997 | Krug et al. |
| 5,642,394 A | 6/1997 | Rothschild |
| 5,647,018 A | 7/1997 | Benjamin |
| 5,664,574 A | 9/1997 | Chance |
| 5,668,846 A | 9/1997 | Fox et al. |
| 5,680,525 A | 10/1997 | Sakai et al. |
| 5,684,565 A | 11/1997 | Oshida et al. |
| 5,692,028 A | 11/1997 | Geus et al. |
| 5,692,029 A | 11/1997 | Husseiny et al. |
| 5,692,446 A | 12/1997 | Becker et al. |
| 5,699,400 A | 12/1997 | Lee et al. |
| 5,703,921 A | 12/1997 | Fujita et al. |
| 5,706,816 A | 1/1998 | Mochizuki et al. |
| 5,726,449 A | 3/1998 | Yoshiike et al. |
| 5,739,539 A | 4/1998 | Wang et al. |
| 5,745,542 A | 4/1998 | Gordon et al. |
| 5,748,305 A | 5/1998 | Shimono et al. |
| 5,748,697 A | 5/1998 | Tam |
| 5,754,621 A | 5/1998 | Suzuki et al. |
| 5,756,875 A | 5/1998 | Parker et al. |
| 5,757,981 A | 5/1998 | Kawakubo |
| 5,761,334 A | 6/1998 | Nakajima et al. |
| 5,764,683 A | 6/1998 | Swift et al. |
| 5,764,719 A | 6/1998 | Noettling |
| 5,768,334 A | 6/1998 | Maitrejean et al. |
| 5,777,742 A | 7/1998 | Marron |
| 5,778,046 A | 7/1998 | Molloi et al. |
| 5,779,641 A | 7/1998 | Hatfield et al. |
| 5,784,429 A | 7/1998 | Arai |
| 5,786,597 A | 7/1998 | Lingren et al. |
| 5,787,145 A | 7/1998 | Geus |
| 5,794,788 A | 8/1998 | Massen |
| 5,796,802 A | 8/1998 | Gordon |
| 5,796,868 A | 8/1998 | Dutta-Choudhury |
| 5,799,100 A | 8/1998 | Clarke et al. |
| 5,800,355 A | 9/1998 | Hasegawa |
| 5,802,133 A | 9/1998 | Kawai et al. |
| 5,809,171 A | 9/1998 | Neff et al. |
| 5,815,198 A | 9/1998 | Vachtsevanos et al. |
| 5,815,264 A | 9/1998 | Reed et al. |
| 5,828,722 A | 10/1998 | Ploetz et al. |
| 5,828,774 A | 10/1998 | Wang |
| 5,834,153 A | 11/1998 | Hasegawa et al. |
| 5,838,758 A | 11/1998 | Krug et al. |
| 5,838,759 A | 11/1998 | Armistead |
| 5,841,828 A | 11/1998 | Gordon et al. |
| 5,841,907 A | 11/1998 | Javidi et al. |
| 5,850,465 A | 12/1998 | Shimura et al. |
| 5,862,198 A | 1/1999 | Samarasekera et al. |
| 5,862,258 A | 1/1999 | Taylor |
| 5,864,598 A | 1/1999 | Hsieh et al. |
| 5,866,907 A | 2/1999 | Drukier et al. |
| 5,877,849 A | 3/1999 | Ramer et al. |
| 5,881,123 A | 3/1999 | Tam |
| 5,893,095 A | 4/1999 | Jain et al. |
| 5,894,345 A | 4/1999 | Takamoto et al. |
| 5,901,196 A | 5/1999 | Sauer et al. |
| 5,901,198 A | 5/1999 | Crawford et al. |

| | | |
|---|---|---|
| 5,903,623 A | 5/1999 | Swift et al. |
| 5,909,285 A | 6/1999 | Beaty et al. |
| 5,909,477 A | 6/1999 | Crawford et al. |
| 5,910,765 A | 6/1999 | Slemon et al. |
| 5,910,973 A | 6/1999 | Grodzins |
| 5,911,139 A | 6/1999 | Jain et al. |
| 5,917,190 A | 6/1999 | Yodh et al. |
| 5,926,568 A | 7/1999 | Chaney et al. |
| 5,940,468 A | 8/1999 | Huang et al. |
| 5,943,388 A | 8/1999 | Tumer |
| 5,951,474 A | 9/1999 | Matsunaga et al. |
| 5,953,452 A | 9/1999 | Boone et al. |
| 5,960,104 A | 9/1999 | Conners et al. |
| 5,974,111 A | 10/1999 | Krug et al. |
| 5,978,440 A | 11/1999 | Kang et al. |
| 5,981,949 A | 11/1999 | Leahy et al. |
| 5,987,095 A | 11/1999 | Chapman et al. |
| 6,005,916 A | 12/1999 | Johnson et al. |
| 6,008,496 A | 12/1999 | Winefordner et al. |
| 6,009,142 A | 12/1999 | Sauer et al. |
| 6,011,620 A | 1/2000 | Sites et al. |
| 6,018,561 A | 1/2000 | Tam |
| 6,018,562 A | 1/2000 | Willson |
| 6,031,890 A | 2/2000 | Bermbach et al. |
| 6,035,014 A | 3/2000 | Hiraoglu et al. |
| 6,043,870 A | 3/2000 | Chen |
| 6,049,381 A | 4/2000 | Reintjes et al. |
| 6,057,761 A | 5/2000 | Yukl |
| 6,057,909 A | 5/2000 | Yahav et al. |
| 6,058,159 A | 5/2000 | Conway et al. |
| 6,060,677 A | 5/2000 | Ulrichsen et al. |
| 6,070,583 A | 6/2000 | Perelman et al. |
| 6,075,591 A | 6/2000 | Vokhmin |
| 6,075,880 A | 6/2000 | Kollhof et al. |
| 6,078,638 A | 6/2000 | Sauer et al. |
| 6,080,994 A | 6/2000 | Carrott et al. |
| 6,081,580 A | 6/2000 | Grodzins et al. |
| 6,084,939 A | 7/2000 | Tamura |
| 6,088,423 A | 7/2000 | Krug et al. |
| 6,094,472 A | 7/2000 | Smith |
| 6,097,427 A | 8/2000 | Dey et al. |
| 6,097,483 A | 8/2000 | Komatsu |
| 6,149,300 A | 11/2000 | Greenway et al. |
| 6,153,873 A | 11/2000 | Wolf |
| 6,155,179 A | 12/2000 | Aust et al. |
| 6,157,730 A | 12/2000 | Roever et al. |
| 6,163,403 A | 12/2000 | Carrott et al. |
| 6,175,417 B1 | 1/2001 | Do et al. |
| 6,175,613 B1 | 1/2001 | Boutenko et al. |
| 6,185,272 B1 | 2/2001 | Hiraoglu et al. |
| 6,188,747 B1 | 2/2001 | Geus et al. |
| 6,195,413 B1 | 2/2001 | Geus et al. |
| 6,195,444 B1 | 2/2001 | Simanovsky et al. |
| 6,198,795 B1 | 3/2001 | Naumann et al. |
| 6,205,195 B1 | 3/2001 | Lanza |
| 6,205,243 B1 | 3/2001 | Migdal et al. |
| 6,218,943 B1 | 4/2001 | Ellenbogen |
| 6,222,902 B1 | 4/2001 | Lin et al. |
| 6,229,872 B1 | 5/2001 | Amos |
| 6,233,303 B1 | 5/2001 | Tam |
| 6,236,704 B1 | 5/2001 | Navab et al. |
| 6,236,708 B1 | 5/2001 | Lin et al. |
| 6,249,341 B1 | 6/2001 | Basiji et al. |
| 6,252,929 B1 | 6/2001 | Swift et al. |
| 6,256,370 B1 | 7/2001 | Yavuz |
| 6,256,404 B1 | 7/2001 | Gordon et al. |
| 6,263,044 B1 | 7/2001 | Joosten |
| 6,263,231 B1 | 7/2001 | Reitter |
| 6,272,204 B1 | 8/2001 | Amtower et al. |
| 6,272,233 B1 | 8/2001 | Takeo |
| 6,278,760 B1 | 8/2001 | Ogawa et al. |
| 6,288,974 B1 | 9/2001 | Nelson |
| 6,289,235 B1 | 9/2001 | Webber et al. |
| 6,292,260 B1 | 9/2001 | Lin et al. |
| 6,292,530 B1 | 9/2001 | Yavus et al. |
| 6,292,533 B1 | 9/2001 | Swift et al. |
| 6,324,245 B1 | 11/2001 | Tam |
| 6,335,742 B1 | 1/2002 | Takemoto |
| 6,353,673 B1 | 3/2002 | Shnitser et al. |
| 6,366,638 B1 | 4/2002 | Hsieh et al. |
| 6,370,222 B1 | 4/2002 | Cornick, Jr. |
| 6,373,916 B1 | 4/2002 | Inoue et al. |
| 6,373,970 B1 | 4/2002 | Dong et al. |
| 6,373,979 B1 | 4/2002 | Wang |
| 6,381,297 B1 | 4/2002 | Hsieh |
| 6,388,788 B1 | 5/2002 | Harris et al. |
| 6,403,960 B1 | 6/2002 | Wellnitz et al. |
| 6,404,841 B1 | 6/2002 | Pforr et al. |
| 6,408,042 B1 | 6/2002 | Hsieh |
| 6,415,012 B1 | 7/2002 | Taguchi et al. |
| 6,418,184 B1 | 7/2002 | Wang et al. |
| 6,418,189 B1 | 7/2002 | Schafer |
| 6,424,692 B1 | 7/2002 | Suzuki |
| 6,442,288 B1 | 8/2002 | Haerer et al. |
| 6,445,765 B1 | 9/2002 | Frank et al. |
| 6,448,545 B1 | 9/2002 | Chen |
| 6,453,003 B1 | 9/2002 | Springer et al. |
| 6,459,755 B1 | 10/2002 | Li |
| 6,463,181 B2 | 10/2002 | Duarte |
| 6,473,489 B2 | 10/2002 | Bani-Hashemi et al. |
| 6,477,221 B1 | 11/2002 | Ning |
| 6,480,285 B1 | 11/2002 | Hill |
| 6,480,564 B1 | 11/2002 | Kim et al. |
| 6,483,894 B2 | 11/2002 | Hartick et al. |
| 6,487,307 B1 | 11/2002 | Hennessey et al. |
| 6,502,984 B2 | 1/2003 | Ogura et al. |
| 6,507,025 B1 | 1/2003 | Verbinski et al. |
| 6,507,278 B1 | 1/2003 | Brunetti et al. |
| 6,525,331 B1 | 2/2003 | Ngoi et al. |
| 6,526,120 B1 | 2/2003 | Gray et al. |
| 6,532,276 B1 | 3/2003 | Hartick et al. |
| 6,542,574 B2 | 4/2003 | Grodzins |
| 6,542,578 B2 | 4/2003 | Ries et al. |
| 6,542,579 B1 | 4/2003 | Takasawa |
| 6,542,580 B1 | 4/2003 | Carver et al. |
| 6,542,628 B1 | 4/2003 | Muller et al. |
| 6,549,683 B1 | 4/2003 | Bergeron et al. |
| 6,552,809 B1 | 4/2003 | Bergeron et al. |
| 6,559,769 B2 | 5/2003 | Anthony et al. |
| 6,570,177 B1 | 5/2003 | Struckhoff et al. |
| 6,570,708 B1 | 5/2003 | Bergeron et al. |
| 6,570,951 B1 | 5/2003 | Hsieh |
| 6,570,956 B1 | 5/2003 | Rhee et al. |
| 6,574,296 B2 | 6/2003 | Stierstorfer |
| 6,574,297 B2 | 6/2003 | Tam |
| 6,580,777 B1 | 6/2003 | Ueki et al. |
| 6,580,778 B1 | 6/2003 | Meder |
| 6,583,895 B1 | 6/2003 | Kuwahara et al. |
| 6,584,170 B2 | 6/2003 | Aust et al. |
| 6,586,193 B2 | 7/2003 | Yguerabide et al. |
| 6,587,575 B1 | 7/2003 | Windham et al. |
| 6,587,595 B1 | 7/2003 | Henkel et al. |
| 6,597,760 B2 | 7/2003 | Beneke et al. |
| 6,603,536 B1 | 8/2003 | Hasson et al. |
| 6,608,921 B1 | 8/2003 | Inoue et al. |
| 6,611,575 B1 | 8/2003 | Alyassin et al. |
| 6,618,466 B1 | 9/2003 | Ning |
| 6,621,887 B2 | 9/2003 | Albagli et al. |
| 6,621,888 B2 | 9/2003 | Grodzins et al. |
| 6,621,925 B1 | 9/2003 | Ohmori et al. |
| 6,628,982 B1 | 9/2003 | Thomas et al. |
| 6,628,983 B1 | 9/2003 | Gagnon |
| 6,654,443 B1 | 11/2003 | Hoffman |
| 6,661,867 B2 | 12/2003 | Mario et al. |
| 6,663,280 B2 | 12/2003 | Doenges |
| 6,665,373 B1 | 12/2003 | Kotowski et al. |
| 6,707,879 B2 | 3/2004 | McClelland et al. |
| 6,714,623 B2 | 3/2004 | Sako et al. |
| 6,721,387 B1 | 4/2004 | Naidu et al. |
| 6,721,391 B2 | 4/2004 | McClelland et al. |
| 6,724,922 B1 | 4/2004 | Vilsmeier |
| 6,731,819 B1 | 5/2004 | Fukushima et al. |
| 6,735,274 B1 | 5/2004 | Zahavi et al. |
| 6,735,279 B1 | 5/2004 | Jacobs et al. |
| 6,738,450 B1 | 5/2004 | Barford |
| 6,744,909 B1 | 6/2004 | Kostrzewski et al. |
| 6,746,864 B1 | 6/2004 | McNeil et al. |
| 6,751,349 B2 | 6/2004 | Matama |

| | | |
|---|---|---|
| 6,754,374 B1 | 6/2004 | Miller et al. |
| 6,763,148 B1 | 7/2004 | Sternberg et al. |
| 6,785,410 B2 | 8/2004 | Vining et al. |
| H2110 H | 10/2004 | Newman |
| 6,801,647 B1 | 10/2004 | Arakawa |
| 6,803,997 B2 | 10/2004 | Stanek |
| 6,804,412 B1 | 10/2004 | Wilkinson |
| 6,813,395 B1 | 11/2004 | Kinjo |
| 6,825,854 B1 | 11/2004 | Beneke et al. |
| 6,837,422 B1 | 1/2005 | Meder |
| 6,839,403 B1 | 1/2005 | Kotowski et al. |
| 6,839,406 B2 | 1/2005 | Ries et al. |
| 6,843,599 B2 | 1/2005 | Le et al. |
| 6,856,272 B2 | 2/2005 | Levitan et al. |
| 6,865,287 B1 | 3/2005 | Beneke |
| 6,865,509 B1 | 3/2005 | Hsiung et al. |
| 6,868,138 B2 | 3/2005 | Clinthorne et al. |
| 6,873,261 B2 | 3/2005 | Anthony et al. |
| 6,876,322 B2 | 4/2005 | Keller |
| 6,895,072 B2 | 5/2005 | Schrock et al. |
| 6,895,338 B2 | 5/2005 | Hsiung et al. |
| 6,899,540 B1 | 5/2005 | Neiderman et al. |
| 6,918,541 B2 | 7/2005 | Knowles et al. |
| 6,928,141 B2 | 8/2005 | Carver et al. |
| 6,936,828 B2 | 8/2005 | Saccomanno |
| 6,938,488 B2 | 9/2005 | Diaz et al. |
| 6,940,943 B2 | 9/2005 | Claus et al. |
| 6,950,492 B2 | 9/2005 | Besson |
| 6,952,163 B2 | 10/2005 | Huey et al. |
| 6,970,531 B2 | 11/2005 | Eberhard et al. |
| 6,980,681 B1 | 12/2005 | Hsieh |
| 6,982,643 B2 | 1/2006 | Garfinkle |
| 6,990,171 B2 | 1/2006 | Toth et al. |
| 7,000,827 B2 | 2/2006 | Meder |
| 7,012,256 B1 | 3/2006 | Roos et al. |
| 7,020,241 B2 | 3/2006 | Beneke et al. |
| 7,043,474 B2 | 5/2006 | Mojsilovic et al. |
| 7,045,787 B1 | 5/2006 | Verbinski et al. |
| 7,046,761 B2 | 5/2006 | Ellenbogen et al. |
| 7,050,616 B2 | 5/2006 | Hsieh et al. |
| 7,062,074 B1 | 6/2006 | Beneke |
| 7,065,175 B2 | 6/2006 | Green |
| 7,068,751 B2 | 6/2006 | Toth et al. |
| 7,092,485 B2 | 8/2006 | Kravis |
| 7,098,461 B2 | 8/2006 | Endo |
| 7,099,004 B2 | 8/2006 | Masten |
| 7,099,432 B2 | 8/2006 | Ichihara et al. |
| 7,100,165 B2 | 8/2006 | Eldridge et al. |
| 7,103,137 B2 | 9/2006 | Seppi et al. |
| 7,105,828 B2 | 9/2006 | Unger et al. |
| 7,116,749 B2 | 10/2006 | Besson |
| 7,130,456 B2 | 10/2006 | Hillmann |
| 7,136,716 B2 | 11/2006 | Hsiung et al. |
| 7,139,406 B2 | 11/2006 | McClelland et al. |
| 7,142,633 B2 | 11/2006 | Eberhard et al. |
| 7,154,650 B2 | 12/2006 | Lettington |
| 7,164,750 B2 | 1/2007 | Nabors et al. |
| 7,183,906 B2 | 2/2007 | Zanovitch et al. |
| 7,193,515 B1 | 3/2007 | Roberts et al. |
| 7,212,113 B2 | 5/2007 | Zanovitch |
| 7,212,661 B2 | 5/2007 | Samara et al. |
| 7,233,682 B2 | 6/2007 | Levine |
| 7,244,941 B2 | 7/2007 | Roos et al. |
| 7,253,766 B2 | 8/2007 | Foote et al. |
| 7,257,189 B2 | 8/2007 | Modica et al. |
| 7,260,173 B2 * | 8/2007 | Wakayama et al. ............. 378/19 |
| 7,529,341 B2 | 5/2009 | Schlomka et al. |
| 7,720,194 B2 | 5/2010 | Connelly et al. |
| 7,734,066 B2 | 6/2010 | DeLia et al. |
| 7,769,132 B1 | 8/2010 | Hurd et al. |
| 7,792,248 B2 | 9/2010 | Strecker et al. |
| 7,882,141 B2 | 2/2011 | Ono et al. |
| 7,899,232 B2 | 3/2011 | Gudmundson et al. |
| 2001/0016030 A1 | 8/2001 | Nicolas et al. |
| 2001/0021013 A1 | 9/2001 | Hecht et al. |
| 2001/0021244 A1 | 9/2001 | Suzuki et al. |
| 2001/0028696 A1 | 10/2001 | Yamada et al. |
| 2001/0033636 A1 | 10/2001 | Hartick et al. |
| 2001/0038681 A1 | 11/2001 | Stanton et al. |
| 2001/0038705 A1 | 11/2001 | Rubbert et al. |
| 2001/0038707 A1 | 11/2001 | Ohara |
| 2001/0048734 A1 | 12/2001 | Uppaluri et al. |
| 2001/0053197 A1 | 12/2001 | Murayama et al. |
| 2002/0001366 A1 | 1/2002 | Tamura et al. |
| 2002/0015475 A1 | 2/2002 | Matsumoto et al. |
| 2002/0016546 A1 | 2/2002 | Cerofolini |
| 2002/0017620 A1 | 2/2002 | Oomori et al. |
| 2002/0018199 A1 | 2/2002 | Blumenfeld et al. |
| 2002/0024016 A1 | 2/2002 | Endo |
| 2002/0027970 A1 | 3/2002 | Chapman et al. |
| 2002/0028994 A1 | 3/2002 | Kamiyama |
| 2002/0031246 A1 | 3/2002 | Kawano |
| 2002/0037068 A1 | 3/2002 | Oikawa |
| 2002/0044691 A1 | 4/2002 | Matsugu |
| 2002/0054694 A1 | 5/2002 | Vachtsevanos et al. |
| 2002/0067259 A1 | 6/2002 | Fufidio et al. |
| 2002/0067793 A1 | 6/2002 | Stierstorfer |
| 2002/0085046 A1 | 7/2002 | Furuta et al. |
| 2002/0088952 A1 | 7/2002 | Rao et al. |
| 2002/0094062 A1 | 7/2002 | Dolazza et al. |
| 2002/0094119 A1 | 7/2002 | Sahadevan |
| 2002/0098518 A1 | 7/2002 | Levinson |
| 2002/0106052 A1 | 8/2002 | Menhardt |
| 2002/0114530 A1 * | 8/2002 | Duarte ............................ 382/254 |
| 2002/0122528 A1 | 9/2002 | Besson |
| 2002/0124664 A1 | 9/2002 | Call et al. |
| 2002/0126800 A1 | 9/2002 | Matsumoto et al. |
| 2002/0127586 A1 | 9/2002 | Mortensen |
| 2002/0141625 A1 | 10/2002 | Nelson |
| 2002/0150200 A1 | 10/2002 | Zonneveld |
| 2002/0161534 A1 | 10/2002 | Adler et al. |
| 2002/0168083 A1 | 11/2002 | Garms et al. |
| 2002/0168657 A1 | 11/2002 | Chen et al. |
| 2002/0172324 A1 | 11/2002 | Ellengogen |
| 2002/0172409 A1 | 11/2002 | Saito et al. |
| 2002/0175921 A1 | 11/2002 | Xu et al. |
| 2002/0176534 A1 | 11/2002 | Meder |
| 2002/0186862 A1 | 12/2002 | McClelland et al. |
| 2002/0188197 A1 | 12/2002 | Bishop et al. |
| 2002/0191209 A1 | 12/2002 | Yasumaru |
| 2003/0012420 A1 | 1/2003 | Verwoerd et al. |
| 2003/0023592 A1 | 1/2003 | Modica et al. |
| 2003/0024315 A1 | 2/2003 | Merkel et al. |
| 2003/0031289 A1 | 2/2003 | Hsieh |
| 2003/0031291 A1 | 2/2003 | Yamamoto et al. |
| 2003/0036006 A1 | 2/2003 | Feke et al. |
| 2003/0038945 A1 | 2/2003 | Mahner |
| 2003/0072414 A1 | 4/2003 | Sakaida |
| 2003/0072418 A1 | 4/2003 | Albagli et al. |
| 2003/0072484 A1 | 4/2003 | Kokko et al. |
| 2003/0076924 A1 | 4/2003 | Mario et al. |
| 2003/0081720 A1 | 5/2003 | Swift et al. |
| 2003/0081859 A1 | 5/2003 | Kasutani |
| 2003/0082516 A1 | 5/2003 | Straus |
| 2003/0085348 A1 | 5/2003 | Megerle |
| 2003/0085353 A1 | 5/2003 | Almogy et al. |
| 2003/0091145 A1 | 5/2003 | Mohr et al. |
| 2003/0095633 A1 | 5/2003 | Van Woezik |
| 2003/0095692 A1 | 5/2003 | Mundy et al. |
| 2003/0128812 A1 | 7/2003 | Appleby et al. |
| 2003/0138147 A1 | 7/2003 | Ongkojoyo |
| 2003/0148393 A1 | 8/2003 | Woodbury et al. |
| 2003/0149346 A1 | 8/2003 | Arnone et al. |
| 2003/0165213 A1 | 9/2003 | Maglich |
| 2003/0179853 A1 | 9/2003 | Amemiya et al. |
| 2003/0194121 A1 | 10/2003 | Eberhard et al. |
| 2003/0205676 A1 | 11/2003 | Nelson et al. |
| 2003/0206649 A1 | 11/2003 | Moshe |
| 2003/0210139 A1 | 11/2003 | Brooks et al. |
| 2003/0215051 A1 | 11/2003 | Suzuki |
| 2003/0215143 A1 | 11/2003 | Zakrzewski et al. |
| 2003/0231788 A1 | 12/2003 | Yukhin et al. |
| 2003/0231791 A1 | 12/2003 | Torre-Bueno et al. |
| 2004/0012853 A1 | 1/2004 | Garcia et al. |
| 2004/0013239 A1 | 1/2004 | Gregerson et al. |
| 2004/0016271 A1 | 1/2004 | Shah et al. |
| 2004/0017882 A1 | 1/2004 | Misawa et al. |
| 2004/0017883 A1 | 1/2004 | Takagi et al. |

| | | | | | | |
|---|---|---|---|---|---|---|
| 2004/0017888 A1 | 1/2004 | Seppi et al. | | 2005/0147199 A1 | 7/2005 | Dunham et al. |
| 2004/0017935 A1 | 1/2004 | Avinash et al. | | 2005/0153356 A1 | 7/2005 | Okawa et al. |
| 2004/0022425 A1 | 2/2004 | Avinash et al. | | 2005/0163354 A1 | 7/2005 | Ziegler |
| 2004/0027127 A1 | 2/2004 | Mills | | 2005/0173284 A1 | 8/2005 | Ambrefe, Jr. |
| 2004/0037462 A1 | 2/2004 | Lewis et al. | | 2005/0189412 A1 | 9/2005 | Hudnut et al. |
| 2004/0041082 A1 | 3/2004 | Harmon | | 2005/0190882 A1 | 9/2005 | McGuire |
| 2004/0051030 A1 | 3/2004 | Olszak et al. | | 2005/0206514 A1 | 9/2005 | Zanovitch et al. |
| 2004/0062342 A1 | 4/2004 | Cahill | | 2005/0207655 A1 | 9/2005 | Chopra et al. |
| 2004/0062349 A1 | 4/2004 | Schuster | | 2005/0212913 A1 | 9/2005 | Richter |
| 2004/0062351 A1 | 4/2004 | Yoshioka | | 2005/0219523 A1 | 10/2005 | Onuma et al. |
| 2004/0066882 A1 | 4/2004 | Eberhard et al. | | 2005/0220264 A1 | 10/2005 | Homegger |
| 2004/0066884 A1 | 4/2004 | Hermann Claus et al. | | 2005/0226375 A1 | 10/2005 | Eberhard et al. |
| 2004/0066890 A1 | 4/2004 | Dalmijn et al. | | 2005/0231421 A1 | 10/2005 | Fleisher et al. |
| 2004/0075058 A1 | 4/2004 | Blevis et al. | | 2005/0238232 A1 | 10/2005 | Ying et al. |
| 2004/0080315 A1 | 4/2004 | Beevor et al. | | 2005/0240858 A1 | 10/2005 | Croft et al. |
| 2004/0082846 A1 | 4/2004 | Johnson et al. | | 2005/0248450 A1 | 11/2005 | Zanovitch |
| 2004/0083958 A1 | 5/2004 | Saidman et al. | | 2005/0249416 A1 | 11/2005 | Leue et al. |
| 2004/0086075 A1 | 5/2004 | Hein et al. | | 2005/0251397 A1 | 11/2005 | Zanovitch et al. |
| 2004/0086160 A1 | 5/2004 | Zimmermann | | 2005/0251398 A1 | 11/2005 | Zanovitch et al. |
| 2004/0087844 A1 | 5/2004 | Yen | | 2005/0259868 A1 | 11/2005 | Sones |
| 2004/0101097 A1 | 5/2004 | Wakayama et al. | | 2005/0265517 A1 | 12/2005 | Gary |
| 2004/0102700 A1 | 5/2004 | Asafusa | | 2005/0271184 A1 | 12/2005 | Ovadia |
| 2004/0109231 A1 | 6/2004 | Haisch et al. | | 2005/0275831 A1 | 12/2005 | Silver |
| 2004/0120009 A1 | 6/2004 | White et al. | | 2005/0276376 A1 | 12/2005 | Eilbert |
| 2004/0120857 A1 | 6/2004 | Smith et al. | | 2005/0276443 A1 | 12/2005 | Slamani et al. |
| 2004/0134986 A1 | 7/2004 | Studer et al. | | 2005/0279936 A1 | 12/2005 | Litman et al. |
| 2004/0141056 A1 | 7/2004 | Izumi et al. | | 2005/0283079 A1 | 12/2005 | Steen et al. |
| 2004/0142386 A1 | 7/2004 | Rigler et al. | | 2006/0000911 A1 | 1/2006 | Stekel |
| 2004/0160599 A1 | 8/2004 | Hamamatsu et al. | | 2006/0002504 A1 | 1/2006 | De Man et al. |
| 2004/0161073 A1 | 8/2004 | Nokita | | 2006/0008054 A1 | 1/2006 | Ohara |
| 2004/0175041 A1 | 9/2004 | Miller | | 2006/0009269 A1 | 1/2006 | Hoskinson et al. |
| 2004/0176677 A1 | 9/2004 | Hwu et al. | | 2006/0013455 A1 | 1/2006 | Watson et al. |
| 2004/0212492 A1 | 10/2004 | Boesch et al. | | 2006/0013464 A1 | 1/2006 | Ramsay et al. |
| 2004/0213377 A1 | 10/2004 | Endo | | 2006/0017605 A1 | 1/2006 | Lovberg et al. |
| 2004/0213600 A1 | 10/2004 | Watanabe et al. | | 2006/0018434 A1 | 1/2006 | Jacobs et al. |
| 2004/0218729 A1 | 11/2004 | Xue et al. | | 2006/0018517 A1 | 1/2006 | Chen et al. |
| 2004/0225222 A1 | 11/2004 | Zeng et al. | | 2006/0019409 A1 | 1/2006 | Nelson et al. |
| 2004/0236520 A1 | 11/2004 | Williams et al. | | 2006/0034503 A1 | 2/2006 | Shimayama |
| 2004/0240612 A1 | 12/2004 | Suzuki | | 2006/0036167 A1 | 2/2006 | Shina |
| 2004/0247071 A1 | 12/2004 | Dafni | | 2006/0045235 A1 | 3/2006 | Bruder et al. |
| 2004/0247171 A1 | 12/2004 | Hashimoto et al. | | 2006/0045323 A1 | 3/2006 | Ateya |
| 2004/0252024 A1 | 12/2004 | Huey et al. | | 2006/0056584 A1 | 3/2006 | Allman et al. |
| 2004/0252870 A1 | 12/2004 | Reeves et al. | | 2006/0064246 A1 | 3/2006 | Medberry et al. |
| 2004/0253660 A1 | 12/2004 | Gibbs et al. | | 2006/0065844 A1 | 3/2006 | Zelakiewicz et al. |
| 2004/0258198 A1 | 12/2004 | Carver et al. | | 2006/0072702 A1 | 4/2006 | Chapman |
| 2004/0258202 A1 | 12/2004 | Wernick et al. | | 2006/0083417 A1* | 4/2006 | Dehmeshki ............... 382/131 |
| 2004/0263379 A1 | 12/2004 | Keller | | 2006/0083418 A1 | 4/2006 | Watson et al. |
| 2004/0264624 A1 | 12/2004 | Tanaka et al. | | 2006/0084872 A1 | 4/2006 | Ichikawa et al. |
| 2004/0264648 A1 | 12/2004 | Claus et al. | | 2006/0086794 A1 | 4/2006 | Knowles et al. |
| 2004/0265175 A1 | 12/2004 | Witty et al. | | 2006/0093088 A1 | 5/2006 | Sowerby et al. |
| 2005/0008119 A1 | 1/2005 | McClelland et al. | | 2006/0098773 A1 | 5/2006 | Peschmann |
| 2005/0008203 A1 | 1/2005 | Dixon | | 2006/0098866 A1 | 5/2006 | Whitson et al. |
| 2005/0017181 A1 | 1/2005 | Kearfott et al. | | 2006/0115109 A1 | 6/2006 | Whitson et al. |
| 2005/0018812 A1 | 1/2005 | Wolfs | | 2006/0116566 A1 | 6/2006 | Bruijns |
| 2005/0024199 A1* | 2/2005 | Huey et al. ............... 340/521 | | 2006/0119837 A1 | 6/2006 | Raguin et al. |
| 2005/0025280 A1 | 2/2005 | Schulte | | 2006/0133650 A1 | 6/2006 | Xie et al. |
| 2005/0025350 A1 | 2/2005 | Engelbart et al. | | 2006/0133659 A1 | 6/2006 | Hammond |
| 2005/0025377 A1 | 2/2005 | Avinash et al. | | 2006/0142662 A1 | 6/2006 | Van Beek |
| 2005/0031069 A1 | 2/2005 | Kaucic et al. | | 2006/0142984 A1 | 6/2006 | Weese et al. |
| 2005/0053307 A1 | 3/2005 | Nose et al. | | 2006/0173268 A1 | 8/2006 | Mullick et al. |
| 2005/0057354 A1 | 3/2005 | Jenkins et al. | | 2006/0176062 A1 | 8/2006 | Yang et al. |
| 2005/0058242 A1 | 3/2005 | Peschmann | | 2006/0203960 A1 | 9/2006 | Schlomka et al. |
| 2005/0058350 A1 | 3/2005 | Dugan et al. | | 2006/0204080 A1 | 9/2006 | Sones et al. |
| 2005/0061955 A1 | 3/2005 | Endo | | 2006/0215811 A1 | 9/2006 | Modica et al. |
| 2005/0069085 A1 | 3/2005 | Lewis | | 2006/0228040 A1* | 10/2006 | Simon et al. ............... 382/254 |
| 2005/0074088 A1 | 4/2005 | Ichihara et al. | | 2006/0255929 A1 | 11/2006 | Zanovitch et al. |
| 2005/0085721 A1 | 4/2005 | Fauver et al. | | 2006/0257005 A1 | 11/2006 | Bergeron et al. |
| 2005/0094856 A1 | 5/2005 | Warren | | 2006/0262902 A1 | 11/2006 | Wattenburg |
| 2005/0098728 A1 | 5/2005 | Alfano et al. | | 2006/0269135 A1 | 11/2006 | Ramsay et al. |
| 2005/0105680 A1 | 5/2005 | Nabors et al. | | 2006/0273257 A1 | 12/2006 | Roos et al. |
| 2005/0110672 A1 | 5/2005 | Cardiasmenos et al. | | 2006/0274916 A1 | 12/2006 | Chan et al. |
| 2005/0111618 A1 | 5/2005 | Sommer, Jr. et al. | | 2006/0282886 A1 | 12/2006 | Gaug |
| 2005/0113961 A1 | 5/2005 | Sabol et al. | | 2007/0003122 A1 | 1/2007 | Sirohey et al. |
| 2005/0117693 A1 | 6/2005 | Miyano | | 2007/0041612 A1 | 2/2007 | Perron et al. |
| 2005/0117700 A1 | 6/2005 | Peschmann | | 2007/0041613 A1 | 2/2007 | Perron et al. |
| 2005/0123093 A1 | 6/2005 | Lawaczeck et al. | | 2007/0058037 A1 | 3/2007 | Bergeron et al. |
| 2005/0123174 A1 | 6/2005 | Gorsky et al. | | 2007/0147585 A1 | 6/2007 | Eilbert et al. |
| 2005/0128069 A1 | 6/2005 | Skatter | | 2007/0168467 A1 | 7/2007 | Hu et al. |
| 2005/0133708 A1 | 6/2005 | Eberhard et al. | | 2007/0195994 A1 | 8/2007 | McClelland et al. |

| | | | |
|---|---|---|---|
| 2007/0196803 A1* | 8/2007 | Goodrich | 434/323 |
| 2007/0200566 A1 | 8/2007 | Clark et al. | |
| 2007/0206719 A1 | 9/2007 | Suryanarayanan et al. | |
| 2007/0210921 A1 | 9/2007 | Volpi et al. | |
| 2007/0269005 A1 | 11/2007 | Chalmers et al. | |
| 2008/0152082 A1* | 6/2008 | Bouchard et al. | 378/57 |
| 2008/0170660 A1* | 7/2008 | Gudmundson et al. | 378/57 |
| 2008/0236275 A1 | 10/2008 | Breed et al. | |
| 2008/0260097 A1 | 10/2008 | Anwar et al. | |
| 2009/0175411 A1* | 7/2009 | Gudmundson et al. | 378/57 |
| 2012/0300902 A1* | 11/2012 | Modica et al. | 378/57 |

FOREIGN PATENT DOCUMENTS

| | | |
|---|---|---|
| CA | 2574402 | 1/2006 |
| CA | 2651131 C | 11/2010 |
| EP | 0 577 380 A1 | 1/1994 |
| WO | 97/18462 A1 | 5/1997 |
| WO | 01/27601 A1 | 4/2001 |
| WO | WO 02/082290 A1 | 10/2002 |
| WO | WO 03/069498 A1 | 8/2003 |
| WO | WO 03/107113 A2 | 12/2003 |
| WO | WO 2005/086616 A2 | 9/2005 |
| WO | 2006/119609 A1 | 11/2006 |
| WO | WO 2006/119603 A1 | 11/2006 |
| WO | WO2008/034232 A1 | 3/2008 |
| WO | WO2008/040119 A1 | 4/2008 |
| WO | PCT/CA2008/000275 | 10/2009 |

OTHER PUBLICATIONS

PCT/CA2005/001930 (IPRP), Nov. 13, 2007, OptoSecurity Inc.
PCT/CA2006/000655 (IPRP), Nov. 13, 2007, OptoSecurity Inc.
PCT/CA2006/000751 (IPRP), Nov. 13, 2007, OptoSecurity Inc.
PCT/CA2007/001297 (ISR), Nov. 14, 2007, OptoSecurity Inc. et al.
PCT/CA2007/001298 (ISR), Nov. 14, 2007, OptoSecurity Inc. et al.
PCT/CA2007/001658 (ISR), Jan. 10, 2008, OptoSecurity Inc. et al.
PCT/CA2007/001749 (ISR), Jan. 14, 2008, OptoSecurity Inc. et al.
PCT/CA2005/000716 (ISR), Feb. 3, 2006. OptoSecurity Inc.
PCT/CA/2005/001930 (ISR), Apr. 7, 2006, OptoSecurity Inc.
PCT/CA/2006/000655 (ISR), Aug. 3, 2006, OptoSecurity Inc.
PCT/CA/2006/000751 (ISR), Aug. 28, 2006, OptoSecurity Inc.
H.J. Caufield and W.T. Maloney, Improved discrimination in optical character recognition, 1969, Appl. Opt., 8, p. 2354.
Mahalanobis, A. et al., Minimum average correlation energy filters, Sep. 1, 1987, Appl. Opt. 26 No. 17, pp. 3633-3640.
Joseph L. Horner et al., Phase-only matched filtering, Mar. 15, 1994, Appl. Opt. vol. 23 No. 6, pp. 812-816.
Benjamin R., Object-based 3D X-ray imaging for second-line security screening, 1995, Conf. Publ. No. 408, Londonn, Uk: IEE, pp. 310-313, Abstract.
Andre Morin et al., Optical character recognition (OCR) in uncontrolled environnments using optical correlators, 1999, SPIE Int., pp. 346-356.
PinPoint TM Threat Identification Software dated Jul. 25, 2005 of URL: http://www.guardiantechintl.com/security.php.?npage+pinpoint, 4 pages.
Gregor Mcdonald, Fast Pattern Recognition, QinetiQ Ltd 2003.
Secure Flight passenger screening program, Oct. 28, 2005, http://www.globalsecurity.org/securiy/systems/passenger_screen.htm, 6 pages.
Security technology overview: Advanced vehicle verification & threat identification, www.optosecurity.com and www.extremeCCTV.com, 1 page.
B.V.K. Vijaya Kumar et al., Spatial Frequency Domain Image Processing for Biometric Recognition, 2002, pp. 1-53-1-56, vol. 1, IEEE ICIP, Pittsburgh, PA, USA.
eXaminer 3DX, Explosives Detection System, L3 Communications, Security & Detection Systems, Nov. 8-9, 2005.
Airport Magazine, Solutions, Products, Services, vol. 7, Mar. 2006, selected pages.
PCT/CA2007/000779 (ISR), Aug. 17, 2007, OptoSecurity Inc.
PCT/CA2007/000840 (ISR), Aug. 22, 2007, OptoSecurity Inc.
Extended European Search Report issued by the European Patent Office on Oct. 19, 2011 in connection with European Patent Application Serial No. 07719704.4, 9 pages.

Final Office Action issued by United States Patent and Trademark Office on Nov. 10, 2011 in connection with U.S. Appl. No. 11/407,217, 14 pages.
Extended European Search Report issued by the European Patent Office on Nov. 22, 2011 in connection with European Patent Application Serial No. 07719764.8, 8 pages.
Lisa Gottesfeld Brown, "A Survey of Image Registration Techniques", ACM Computing Surveys, ACM, New York, NY, US, vol. 24, No. 4, Dec. 1, 1992, XP002942558, ISSN: 0360-0300, DOI: 10.1145/146370.146374 * sect.2.2 *, pp. 325-376.
Hartley et al., "Multiple View Geometry in Computer Vision Contents", Multiple View Geometry in Computer Vision, Cambridge: Cambridge University Press, GB, Jan. 1, 2004, XP002244390, ISBN: 978-0-521-54051-3 * the whole document *, pp. V-X.
Jutamulia S. Yu, "Optical Pattern Recognition", 2000, Cambridge University Press, p. v-p. xii.
A. Schwaninger et al., "Evaluation of CBT for increasing threat detection performance in X-ray screening", The Internet Society: Advances in learning, Commerce and Security, Jan. 1, 2004, XP55009216, Retrived from the Internet: URL:http://www.casra.ch/publications/doc/SchwaningerHofer2004.pdf [retrieved on Oct. 11, 2011] sect.2.1, 2.2, pp. 147-156.
Y.S. Yong et al., "Threat image projection for stereoscopic X-ray imaging", Jan. 1, 2001, Visualization, Imaging, and Image Processing Proceedings of the IASTED International Conference, Sep. 3-5, 2001 Marsella, Spain, Anaheim, Calif.[U.A.] IASTED/ACTA Press, pp. 301-306, P008144120, ISBN: 978-0-88986-309-5* p. 1 *.
Mark Mitckes, "Threat Image Projection—An Overview", Oct. 2003, XP002661292, Retrieved from the Internet URL:web.eecs.utk.edu/{lme/t1p.pdf * sect.l, 2.1, 3,figures 1-9 *, pp. 1-23.
Adrian Schwaninger, "Increasing Efficiency in Airport Security Screening", AVSEC World 2004, Nov. 3, 2004, XP55009005, Retrieved from the Internet: URL:http://www.casra.ch/publications/doc/ Schwaninger2004a.pdf [retrieved on Oct. 10, 2007] * sect 2.1figures 1,2,3,4,7 *, pp. 1-14.
F. Hofer et al. "Using threat image projection data for assessing individual screener performance", WIT Transactions on the Built Environment, Jan. 1, 2005, XP55009395, Safety and Security Engineering, Retrieved from the Internet: URL:http://www.casra.ch/publications/doc/HoferSchwaninger2005.pdf [retrieved on Oct. 12, 2011] * sect.2.1.1 *, pp. 417-426.
Office Action mailed on Feb. 13, 2009 in connection with U.S. Appl. No. 11/268,749, 7 pages.
Office Action mailed on May 28, 2009 in connection with U.S. Appl. No. 11/268,749, 18 pages.
Office Action mailed on Jul. 2, 2009 in connection with U.S. Appl. No. 11/431,627, 34 pages.
Office Action mailed on Dec. 2, 2008 in connection with Canadian Patent Application 2,546,296, 2 pages.
Office Action mailed on Jun. 29, 2009 in connection with Canadian Patent Application 2,651,131, 3 pages.
Office Action mailed on Apr. 16, 2010 in connection with U.S. Appl. No. 11/431,627, 46 pages.
PCT/CA2008/000275 (ISR), Oct. 2009, OptoSecurity Inc.
Notice of Allowance issued by the United States Patent and Trademark Office on Mar. 24, 2011 in connection with U.S. Appl. No. 11/431,627, 13 pages.
Extended European Search Report issued by the European Patent Office on Mar. 24, 2011 in connection with European Patent Application Serial No. 08 714 598.3, 7 pages.
Extended European Search Report issued by the European Patent Office on Apr. 1, 2011 in connection with European Patent Application Serial No. 06 741 416.9, 7 pages.
Non-Final Office Action issued by the United States Patent and Trademark Office on Apr. 22, 2011 in connection with U.S. Appl. No. 11/407,217, 20 pages.
Non-Final Office Action issued by the United States Patent and Trademark Office on Aug. 15, 2011 in connection with U.S. Appl. No. 11/920,042, 9 pages.
Restriction Requirement Office Action issued by the United States Patent and Trademark Office on Jun. 11, 2010 in connection with U.S. Appl. No. 11/407,217, 6 pages.

Restriction Requirement Office Action issued by the United States Patent and Trademark Office on Oct. 7, 2010 in connection with U.S. Appl. No. 11/431,719, 5 pages.

Notice of Allowance issued by the United States Patent and Trademark Office on Oct. 26, 2010 in connection with U.S. Appl. No. 11/747,639, 8 pages.

Examiner's Report (Office Action) issued by the Canadian Intellectual Property Office on Jul. 5, 2012 in connection with Canadian Patent Application Serial No. 2,608,119, 3 pages.

Examiner's Report (Office Action) issued by the European Patent Office on Aug. 10, 2012 in connection with European Patent Application No. 07 719 704.4, 5 pages.

Examiner's Report (Office Action) issued by the European Patent Office on Aug. 10, 2012 in connection with European Patent Application Serial No. 07 719 764.8, 6 pages.

\* cited by examiner

USER INTERFACE FOR USE IN SECURITY SCREENING PROVIDING IMAGE ENHANCEMENT CAPABILITIES AND APPARATUS FOR IMPLEMENTING SAME

CROSS-REFERENCES TO RELATED APPLICATIONS

This application is related to U.S. patent application Ser. No. 11/407,217 filed Apr. 20, 2006 by Eric Bergeron et al. and presently pending which was a continuation-in-part application of international PCT patent application serial number PCT/CA2005/000716 filed May 11, 2005 by Eric Bergeron et al. designating the United States.

The contents of the above referenced applications are incorporated herein by reference.

FIELD OF THE INVENTION

The present invention relates generally to security systems and, more particularly, to a user interface providing image enhancement capabilities for use in screening luggage, mail parcels or cargo containers to identify certain objects located therein or for screening persons to identify certain objects located thereon and to a method and system for implementing such a user interface.

BACKGROUND

Security in airports, train stations, ports, mail sorting facilities, office buildings and other public or private venues is becoming increasingly important in particular in light of recent violent events.

Typically, security-screening systems at airports make use of devices generating penetrating radiation, such as x-ray devices, to scan individual pieces of luggage to generate an image conveying the contents of the luggage. The image is displayed on a screen and is examined by a human operator whose task it is to identify, on the basis of the image, potentially threatening objects located in the luggage.

A deficiency with current systems is that they are entirely reliant on the human operator to identify potentially threatening objects. However, the performance of the human operator greatly varies according to such factors as poor training and fatigue. As such, the process of detection and identification of threatening objects is highly susceptible to human error.

Another deficiency with current systems is that the labour costs associated with such systems are significant since human operators must view the images.

Yet another deficiency is that the images displayed on the x-ray machines provide little, if any, guidance as to what is being observed. It will be appreciated that failure to identify a threatening object, such as a weapon for example, may have serious consequences, such as property damage, injuries and human deaths.

Consequently, there is a need in the industry for providing a device for facilitating visual identification of a prohibited object in an image during security screening that alleviates at least in part the deficiencies of the prior art.

SUMMARY OF THE INVENTION

In accordance with a broad aspect, the invention provides a method for facilitating visual identification of a prohibited object in an image during security screening. The method comprises receiving data conveying an image of the contents of a receptacle derived from an apparatus that scans the receptacle with penetrating radiation. The method also comprises receiving information from an automated threat detection processor indicating an area of interest in the image potentially containing a prohibited object. The method also comprises processing the image to generate an enhanced image in which portions outside the area of interest are visually de-emphasized. The method also comprises displaying the enhanced image on a display device.

Advantageously, by de-emphasizing portions of the image outside the area of interest, visual information located in portions of the image outside the area of interest is filtered out. As a result, the enhanced image displayed to the user conveys the area of interest in a visually contrasting manner relative to portions of the image outside the area of interest. As such, during security screening, the attention of screening operators is led to an area of the enhanced image identified as an area of interest and that likely represents a higher risk of hiding a potential threat there by facilitating visual identification of a prohibited object in an image.

In accordance with a specific implementation, the method comprises receiving information from an automated threat detection processor indicating a plurality of areas of interest in the image potentially containing respective prohibited objects. The method also comprises processing the image to generate the enhanced image in which portions outside the areas of interest are visually de-emphasized.

In accordance with a specific example of implementation, portions of the enhanced image inside the area of interest are visually emphasized.

Advantageously, generating an enhanced image by concurrently de-emphasizing portions of the image outside the area of interest and emphasizing portions of the image inside the area of interest, provides an improved visual cue for directing the visual attention of a screener to an area of the image most likely to contain a prohibited object.

In accordance with a specific example of implementation, the method comprises providing a user control allowing a user to select either one of the image conveyed by the data received and the enhanced image to be displayed on the display device.

In accordance with a specific example of implementation, the method comprises providing a user control allowing a user to select a level of enhancement from a set of possible levels of enhancement. In a first example, the method comprises processing the image to generate the enhanced image such that portions outside the area of interest in the enhanced image are visually de-emphasized at least in part based on the selected level of enhancement. In a second example, the method comprises processing the image to generate the enhanced image such that portions inside the area of interest in the enhanced image are visually emphasized at least in part based on the selected level of enhancement. Optionally, the method comprises providing a first user control and a second user control for allowing a user to select a first level of enhancement and a second level of enhancement from a set of possible levels of enhancement. The method comprises processing the image to generate the enhanced image such that portions inside the area of interest in the enhanced image are visually emphasized at least in part based on the selected second level of enhancement and portions outside the area of interest are visually de-emphasized at least in part based on the selected first level of enhancement.

In accordance with a specific example of implementation, the method comprises providing a user control allowing a user to select a level of enlargement from a set of possible levels of enlargement. The method also comprises processing the image to generate the enhanced image such that portions inside the area of interest are enlarged at least in part based on the selected level of enlargement such that features of the portion of the enhanced image inside the area of interest appear on a larger scale than features in portions of the enhanced image outside the area of interest.

In accordance with another broad aspect, the invention provides and apparatus suitable for implementing a user interface for facilitating visual identification of a prohibited object in an image during security screening in accordance with the above described method.

In accordance with another broad aspect, the invention provides a computer readable storage medium including a program element suitable for execution by a CPU for implementing a graphical user interface module for facilitating visual identification of a prohibited object in the image during security screening in accordance with the above described method.

In accordance with yet another broad aspect, the invention provides a system for detecting the presence of one or more prohibited objects in a receptacle. The system includes an image generation apparatus, an automated threat detection processor, a display module and an apparatus for implementing a user interface module. The image generation apparatus is suitable for scanning a receptacle with penetrating radiation to generate data conveying an image of contents of the receptacle. The automated threat detection processor is in communication with the image generation apparatus and is adapted for processing the image to identify an area of interest in the image potentially containing a prohibited object. The apparatus is in communication with the image generation apparatus, the automated threat detection processor and the display module and implements a user interface module for facilitating visual identification of a prohibited object in an image during security screening. The apparatus comprises a first input for receiving the data conveying the image of the contents of the receptacle and a second input for receiving information indicating the area of interest in the image. The apparatus also comprises a processing unit in communication with the first input and the second input. The processing unit is operative for implementing the user interface module. The user interface module is adapted for processing the image to generate an enhanced image in which portions outside the area of interest are visually de-emphasized and for displaying the enhanced image on the display module.

In accordance with yet another broad aspect, the invention provides a client-server system for implementing a graphical user interface module for facilitating visual identification of a prohibited object in an image during security screening. The client-server system comprising a client system and a server system operative to exchange messages over a data network. The server system stores a program element for execution by a CPU. The program element comprises a first program element component executed on the server system for receiving data conveying an image of the contents of a receptacle derived from an apparatus that scans the receptacle with penetrating radiation and for receiving information from an automated threat detection processor indicating an area of interest in the image potentially containing a prohibited object. The program element also comprises a second program element component executed on the server system for processing the image to generate an enhanced image in which portions outside the area of interest are visually de-emphasized. The program element comprises a third program element component executed on the server system for sending messages to the client system for causing the client system to display the enhanced image on a display device.

In accordance with another broad aspect, the invention provides an apparatus for implementing a user interface module for facilitating visual identification of a prohibited object in an image during security screening. The apparatus comprises means for receiving data conveying an image of the contents of a receptacle derived from an apparatus that scans the receptacle with penetrating radiation. The apparatus also comprises means for receiving information from an automated threat detection processor indicating an area of interest in the image potentially containing a prohibited object. The apparatus also comprises means for processing the image to generate an enhanced image in which portions outside the area of interest are visually de-emphasized. The apparatus also comprises means for releasing a display signal, the display signal being suitable for causing a display device to display the enhanced image.

In accordance with another broad aspect, the invention provides a method for facilitating visual identification of a prohibited object in an image during security screening. The method comprises receiving data conveying an image of the contents of a receptacle derived from an apparatus that scans the receptacle with penetrating radiation. The method also comprises receiving information from an automated threat detection processor indicating an area of interest in the image potentially containing a prohibited object. The method also comprises processing the image to generate an enhanced image in which features appearing inside the area of interest are visually emphasized. The method also comprises displaying the enhanced image on a display device.

In accordance with a specific example of implementation, the method comprises providing a user control allowing a user to select either one of the received image and the enhanced image for display on the display device.

In accordance with another broad aspect, the invention provides and apparatus suitable for implementing a user interface for facilitating visual identification of a prohibited object in an image during security screening in accordance with the above described method.

In accordance with another broad aspect, the invention provides a computer readable storage medium including a program element suitable for execution by a CPU for implementing a graphical user interface module for facilitating visual identification of a prohibited object in the image during security screening in accordance with the above described method.

In accordance with yet another broad aspect, the invention provides a system for detecting the presence of one or more prohibited objects in a receptacle. The system includes an image generation apparatus, an automated threat detection processor, a display module and an apparatus for implementing a user interface module. The image generation apparatus is suitable for scanning a receptacle with penetrating radiation to generate data conveying an image of contents of the receptacle. The automated threat detection processor is in communication with the image generation apparatus and is adapted for processing the image to identify an area of interest in the image potentially containing a prohibited object. The apparatus is in communication with the image generation apparatus, the automated threat detection processor and the display module and implements a user interface module for facilitating visual identification of a prohibited object in an image during security screening. The apparatus comprises a first input for receiving the data conveying the image of the contents of the receptacle and a second input for receiving information indicating the area of interest in the image. The apparatus also comprises a processing unit in communication with the first input and the second input. The processing unit is operative for implementing the user interface module. The user interface module is adapted for processing the image to generate an enhanced image in which features appearing inside the area of interest are visually emphasized and for displaying the enhanced image on the display module.

In accordance with yet another broad aspect, the invention provides a client-server system for implementing a graphical user interface module for facilitating visual identification of a prohibited object in an image during security screening. The client-server system comprising a client system and a server system operative to exchange messages over a data network. The server system stores a program element for execution by a CPU. The program element comprises a first program element component executed on the server system for receiving data conveying an image of the contents of a receptacle derived from an apparatus that scans the receptacle with penetrating radiation and information from an automated threat detection processor indicating an area of interest in the image potentially containing a prohibited object. The program element also comprises a second program element component executed on the server system for processing the image to generate an enhanced image in which features appearing inside the area of interest are visually emphasized. The program element also comprises a third program element component executed on the server system for sending messages to the client system for causing the client system to display the enhanced image on a display device.

In accordance with another broad aspect, the invention provides an apparatus for implementing a user interface module for facilitating visual identification of a prohibited object in an image during security screening. The apparatus comprises means for receiving data conveying an image of the contents of a receptacle derived from an apparatus that scans the receptacle with penetrating radiation. The apparatus also comprises means for receiving information from an automated threat detection processor indicating an area of interest in the image potentially containing a prohibited object. The apparatus also comprises means for processing the image to generate an enhanced image in which features appearing inside the area of interest are visually emphasized. The apparatus also comprises means for displaying the enhanced image on a display module.

In accordance with another broad aspect, the invention provides a method for facilitating visual identification of prohibited objects in images associated with previously screened receptacles. The method comprises providing a plurality of records associated to respective previously screened receptacles. Each record includes an image of the contents of a receptacle derived from an apparatus that scans the receptacle with penetrating radiation and information derived from an automated threat detection processor and indicating an area of interest in the image potentially containing a prohibited object. The method also comprises displaying on a displaying device a first viewing space conveying a set of thumbnail images, each thumbnail image in the set of thumbnail images being derived from a record in the plurality of records. The method also comprises enabling a user to select at least one thumbnail image in the set of thumbnail images. The method is also comprises displaying on the display device a second viewing space conveying an enhanced image derived from a certain record in the plurality of records corresponding to the selected at least one thumbnail image.

In accordance with a specific example of implementation, the enhanced image is an enhanced previous image. The method further comprises receiving data conveying a current image of the contents of a currently screened receptacle derived from an apparatus that scans the currently screened receptacle with penetrating radiation. The method also includes receiving information from an automated threat detection processor indicating an area of interest in the current image potentially containing a prohibited object. The method also includes processing the current image to generate an enhanced current image in which portions outside the area of interest are visually de-emphasized. The method also includes enabling the user to select between the enhanced previous image and the enhanced current image. The method also includes displaying the selected on of the enhanced current image and the enhanced previous image on a display module.

In accordance with another broad aspect, the invention provides a computer readable storage medium including a program element suitable for execution by a CPU for implementing a graphical user interface module for facilitating visual identification of a prohibited object in the image during security screening in accordance with the above described method.

In accordance with another broad aspect, the invention provides an apparatus suitable for implementing a user interface for facilitating visual identification of a prohibited object in an image during security screening. The apparatus comprises a memory and a processing unit. The memory is suitable for storing a plurality of records associated to respective previously screened receptacles, each record including: an image of the contents of a receptacle derived from an apparatus that scans the receptacle with penetrating radiation; and information derived from an automated threat detection processor and indicating an area of interest in the image potentially containing a prohibited object. The processing unit is in communication with the memory unit and implements the user interface module. The user interface module is adapted for displaying on a displaying device a first viewing space conveying a set of thumbnail images, each thumbnail image in the set of thumbnail images being derived from a record in the plurality of records. The user interface module is also adapted for enabling a user to select at least one thumbnail image in the set of thumbnail images. The user interface module is also adapted for displaying on the display device a second viewing space conveying an enhanced image derived from a certain record in the plurality of records corresponding to the selected at least one thumbnail image.

In accordance with another broad aspect, the invention provides a method for displaying information associated to a receptacle for use in detecting the presence of a threat in the receptacle during security screening. The method comprises receiving data conveying an image of the contents of a receptacle derived from an apparatus that scans the receptacle with penetrating radiation. The method also comprises receiving data conveying a level confidence that a threat has been detected in the receptacle. The method also comprises deriving a perceived level of threat associated with the receptacle at least in part based on the level confidence. The method also comprises displaying a screening image derived at least in part based on the data conveying the image of the contents of a receptacle. The method also comprises displaying concurrently with the screening image a threat probability scale, the threat probability scale conveying the perceived level of threat associated with the receptacle in graphical format.

In accordance with another broad aspect, the invention provides and apparatus suitable for implementing a user interface for displaying information associated to a receptacle for use in detecting the presence of a threat in the receptacle during security screening in accordance with the above described method.

In accordance with another broad aspect, the invention provides a computer readable storage medium including a program element suitable for execution by a CPU for implementing a graphical user interface module for displaying information associated to a receptacle for use in detecting the presence of a threat in the receptacle during security screening in accordance with the above described method.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

A detailed description of the embodiments of the present invention is provided herein below, by way of example only, with reference to the accompanying drawings, in which.

Figure 1:
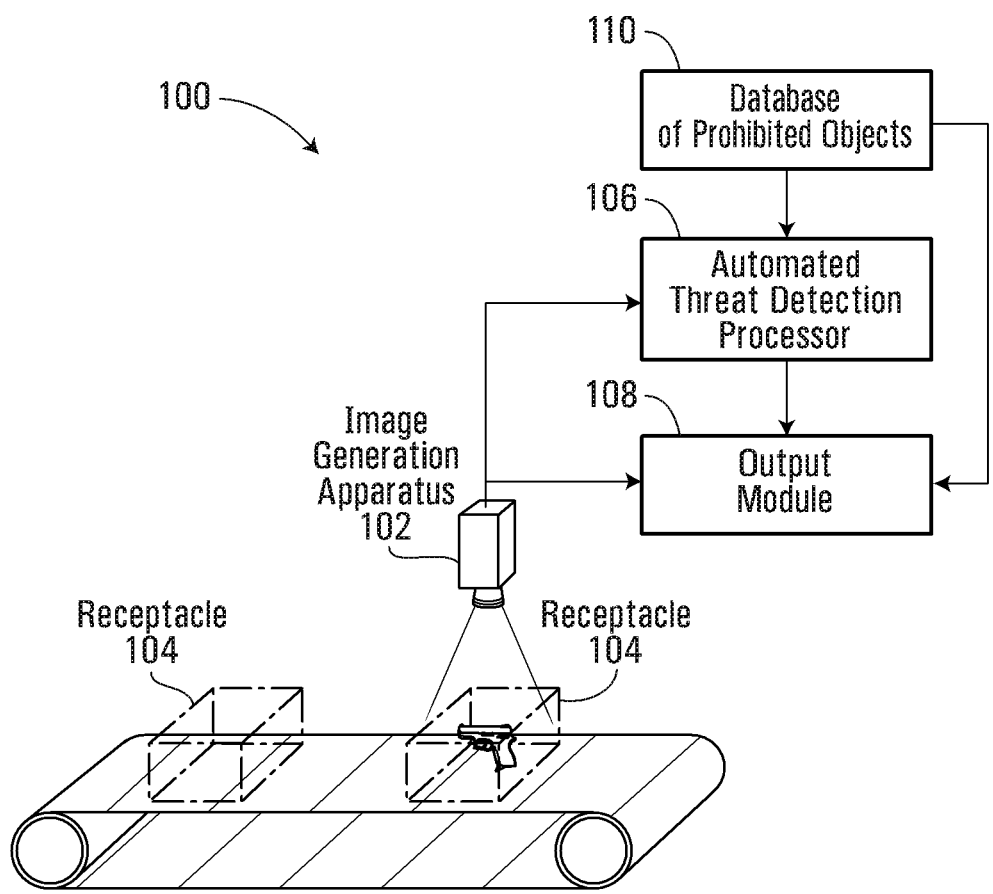
FIG. 1 is a high-level block diagram of a system for screening a receptacle to detect therein the presence of one or more prohibited objects in accordance with a specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

Shown in FIG. 1 is a system 100 for screening a receptacle in accordance with a specific example of implementation of the present invention. It is to be understood that the expression "receptacle", as used for the purposes of the present description, is used to broadly describe an entity adapted for receiving objects therein such as, for example, a luggage item, a cargo container or a mail parcel. In addition, the expression "luggage item" is used to broadly describe luggage, suitcases, handbags, backpacks, briefcases, boxes, parcels or any other similar type of item suitable for containing objects therein.

As depicted, the system 100 includes an image generation apparatus 102, an automated threat detection processor 106 in communication with the image generation apparatus 102 and an output module 108.

The image generation apparatus 102 is adapted for scanning a receptacle 104 to generate data conveying an image of contents of the receptacle 104. The automated threat detection processor 106 receives the data conveying the image of contents of the receptacle 104 and processes that image to identify an area of interest in the image potentially containing a prohibited object. Optionally, as shown in the embodiment depicted in FIG. 1, the automated threat detection processor 106 receives and processes the image from the image generation apparatus 102 in combination with a plurality of images associated with prohibited objects to detect a presence of at least one prohibited object in the receptacle 104. In a specific implementation, the plurality of images is stored in a database of prohibited objects 110. The automated threat detection processor 106 releases information indicating an area of interest in the image and, optionally, information conveying the identity of a prohibited object potentially detected in the receptacle 104. Examples of the manner in which the information indicating an area of interest in the image can be derived will be described later on in the specification. The output module 108 receives the data conveying the image of the contents of the receptacle from the image generation apparatus 102 and the information indicating the area of interest in the image from the automated threat detection processor 106. The output module 108 processes the image to generate an enhanced image based at least in part on the area of interest in the image conveyed by the information released by the automated threat detection processor 106. More specifically, the output module 108 generates an enhanced image so that an operator's attention can be focused on areas of the image most likely to contain prohibited objects. The enhanced image displayed to the user conveys the area of interest in a visually contrasting manner relative to portions of the image outside the area of interest. The output module 108 may process the image to generate an enhanced image in which portions outside the area of interest are visually de-emphasized or in which features appearing inside the area of interest are visually emphasized. Alternatively, the output module 108 may process the image to generate an enhanced image in which portions outside the area of interest are visually de-emphasized and in which features appearing inside the area of interest are visually emphasized. The output module 108 then displays the enhanced image on a display module.

Advantageously, the system 100 provides assistance to the human security personnel using the system by facilitating visual identification of a prohibited object in an image during security screening. More specifically, displaying the enhanced image allows focussing an operator's attention to areas most likely to contain a prohibited object thereby improving the security personnel's efficiency and productivity.

Image Generation Apparatus 102

In a specific example of implementation, the image generation apparatus 102 uses penetrating radiation or emitted radiation to generate data conveying an image of the contents of the receptacle 104. Specific examples of such devices include, without being limited to, x-ray, gamma ray, computed tomography (CT scans), thermal imaging, TeraHertz and millimeter wave devices. Such devices are known in the art and as such will not be described further here. In a non-limiting example of implementation, the image generation apparatus 102 is a conventional x-ray machine suitable for generating data conveying an x-ray image of the receptacle 104. The x-ray image conveys, amongst others, material density information in relation to objects within the receptacle.

The data generated by the image generation apparatus 102 and conveying an image of the contents of the receptacle 104 may convey as a two-dimensional (2-D) image or a three-dimensional (3-D) image and may be in any suitable format. Possible formats include, without being limited to, JPEG, GIF, TIFF and bitmap amongst others.

Database of Prohibited Objects 110

In a specific example of implementation, the database of prohibited objects 110 includes a plurality of entries associated to respective prohibited objects that the system 100 is designed to detect.

In a non-limiting implementation, for each entry associated to a prohibited object at least one image (hereinafter referred to as a "target image") is provided in the database of prohibited objects 110. The format of the target images will depend upon the image processing algorithm implemented by the automated threat detection processor 106. More specifically, the format of the target images is such that a comparison operation can be performed by the automated threat detection processor 106 between the target images and data conveying an image of contents of the receptacle 104.

Optionally, for each entry associated to a prohibited object, a set of images is provided in the database of prohibited objects 110. For example, images depicting the prohibited object in various orientations may be provided.

Optionally still, for each entry associated to a target object, characteristics of the prohibited object are provided. Such characteristics may include, without being limited to, the name of the prohibited object, its associated threat level, the recommended handling procedure when such a prohibited object is detected and any other suitable information. In a specific implementation, the threat level information associated to the target object convey the relative threat level of a prohibited object compared to other prohibited objects in the database of prohibited objects 110. For example, a gun would be given a relatively high threat level while a metallic nail file would be given a relatively low level threat level and a pocket knife would be given a threat level between that of the nail file and the gun. Optionally still, each entry in the database of prohibited objects 110 is also associated to a respective prohibited object identifier data element.

In the case of luggage screening (in an airport facility for example) the prohibited object typically constitutes a potential threat to the safety of the passenger or aircraft.

In the case of mail parcel screening, the prohibited object is typically an object that is normally not permitted to be sent through the mail, such as guns (in Canada) for example, due to registration requirements/permits and so on.

In a non-limiting example of implementation, the database of prohibited objects 110 includes one or more entries associated to objects which are not prohibited but which may represent potential threats. For example, the presence of a metal plate or a metal canister in a piece of luggage going through luggage security screening is not prohibited in itself. However such objects may conceal one or more dangerous objects. As such, it is desirable to be able to detect the presence of such objects in receptacle such as to bring them to the attention of the security screeners.

The specific design and content of the database of prohibited objects 110 may vary from one implementation to the next without detracting from the spirit of the invention. The design of the database is not critical to the present invention and as such will not be described further here.

Although the database of prohibited objects 110 has been shown in FIG. 1 to be a component separate from the automated threat detection processor 106, it will be appreciated that in certain embodiments the database of prohibited objects 110 may be part of automated threat detection processor 106 and that such implementations do not detract from the spirit of the invention. In addition, it will also be appreciated that in certain implementations, a same database of prohibited objects 110 may be shared between multiple threat detection processors 106. It will also be appreciated that in alternative examples of implementation of the present invention database of prohibited objects 110 may be omitted.

Output Module 108

In a specific example of implementation, the output module 108 displays to a user of the system 100 a user interface conveying an enhanced image of contents of the receptacle 104 for facilitating visual identification of a prohibited object.

Figure 2:
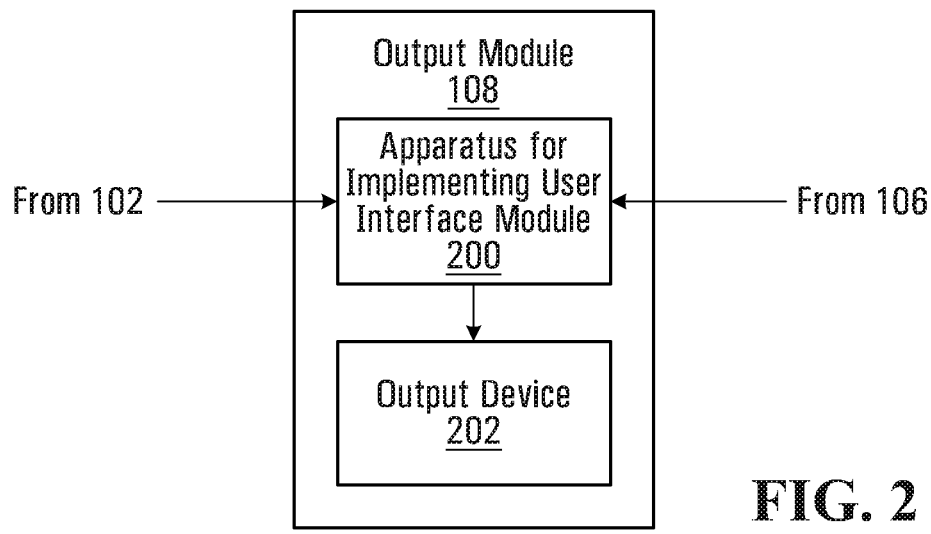
FIG. 2 is a block diagram of an output module suitable for use in connection with the system depicted in FIG. 1 in accordance with a specific example of implementation of the present invention.

A specific example of implementation of the output module 108 is shown in FIG. 2 of the drawings. As depicted, the output module includes an output device 202 and an apparatus implementing a user interface module 200.

The output device 202 may be any device suitable for conveying an enhanced image of contents of the receptacle to a user of the system 100. In a specific example of implementation, the output device 202 is in communication with the apparatus implementing a user interface module 200 and includes a display unit adapted for displaying in visual format information related to the presence of a prohibited object in the receptacle 104. The display unit may be part of a computing station or may be integrated into a hand-held portable device for example. In another specific example of implementation, the output device 202 includes a printer adapted for displaying in printed format information related to the presence of a prohibited object in the receptacle 104. The person skilled in the art will readily appreciate, in light of the present specification, that other suitable types of output devices may be used here without detracting from the spirit of the invention.

The apparatus implementing a user interface module 200 receives data conveying an image of the contents of a receptacle derived from the image generation apparatus 102.

The apparatus 200 also receives information from the automated threat detection processor 106 indicating an area of interest in the image potentially containing a prohibited object. Optionally, the information received from the automated threat detection processor 106 also conveys a level of confidence associated to the area of interest that the area of interest contains a prohibited object. Optionally still, the information received from the automated threat detection processor 106 also conveys an identification of the prohibited object potentially detected in the image.

In a specific example of implementation, the information received from the automated threat detection processor 106 conveying the area of interest includes location information conveying a location in the image of the contents of a receptacle derived from the image generation apparatus 102.

In a first non-limiting example of implementation, the location information is an (X,Y) pixel location conveying the center of an area in the image. The area of interest is established based on the center location (X,Y) provided by the automated threat detection processor 106 in combination with a shape for the area. The shape of the area may be pre-determined in which case it may be of any suitable geometric shape and will have any suitable size. Alternatively, the shape and/or size of the area of interest may be determined by the user on the basis of a user configuration command.

In a second non-limiting example of implementation, the shape and/or size of the area of interest is determined on the basis of information provided by the automated threat detection processor 106. For example, the information may convey a plurality of (X,Y) pixel locations defining an area in the image of the contents of a receptacle. In such a case, the information received will convey both the shape of the area of interest in the image and the position of the area of interest in that image.

In yet another non-limiting example of implementation, the automated threat detection processor 106 may provide an indication of a type of prohibited object potentially identified in the receptacle being screened in addition to a location of that potentially prohibited object in the image. Based on this potentially identified prohibited object, an area of interest having a shape and size conditioned on the basis of the potentially identified prohibited object may be determined.

Figure 3:
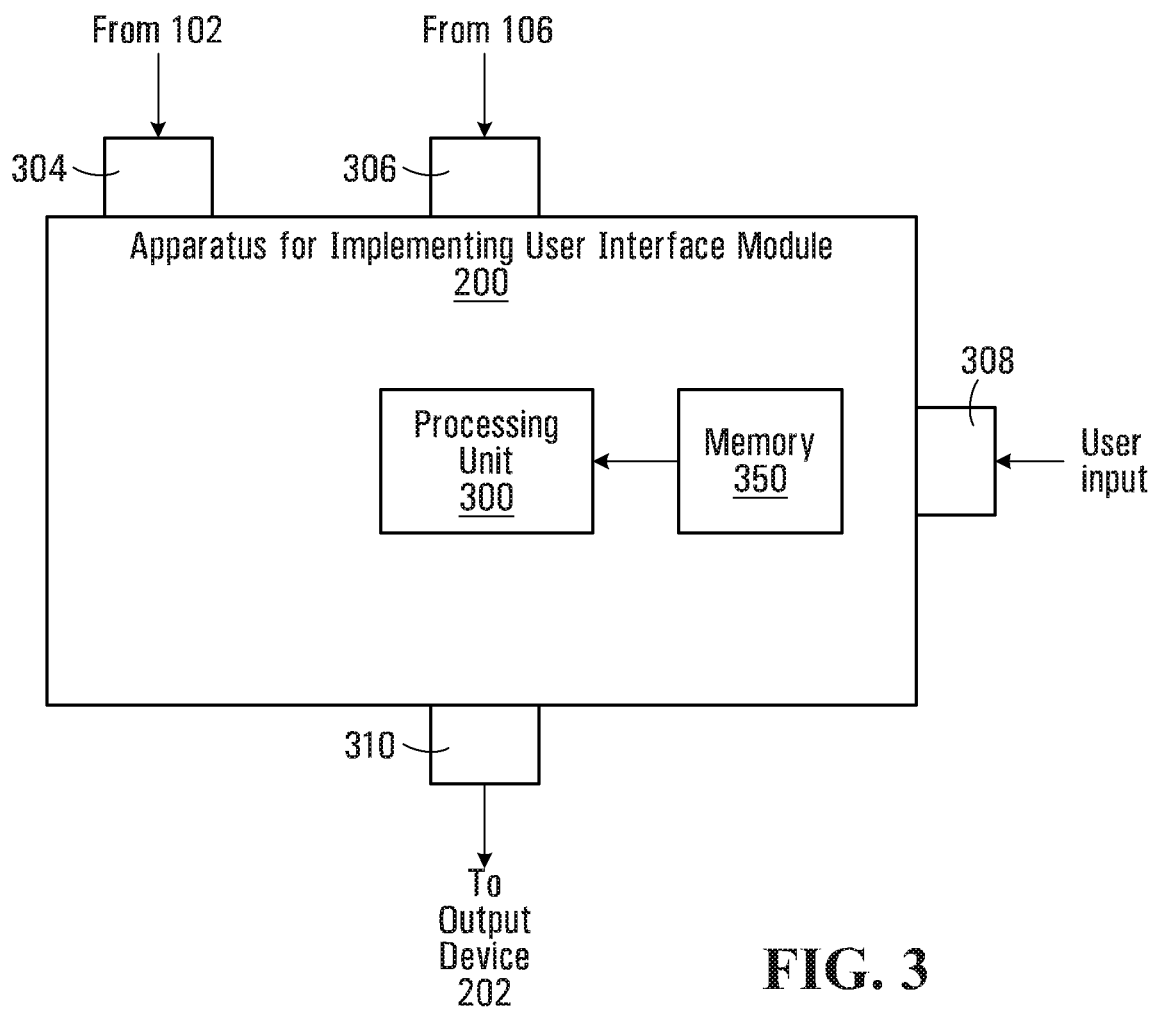
FIG. 3 is a block diagram of an apparatus suitable for implementing a user interface module for facilitating visual identification of a prohibited object in an image during security screening in accordance with a specific example of implementation of the present invention.

A functional block diagram of apparatus 200 is depicted in FIG. 3 of the drawings. In the implementation depicted, the apparatus 200 is adapted for communicating with output device 202 including a display screen for causing the latter to display the user interface module generated by the apparatus 200. The apparatus 200 for implementing a user interface releases a signal at output 310 for causing the output device 202 to convey the user interface to a user of the system.

Figure 4:
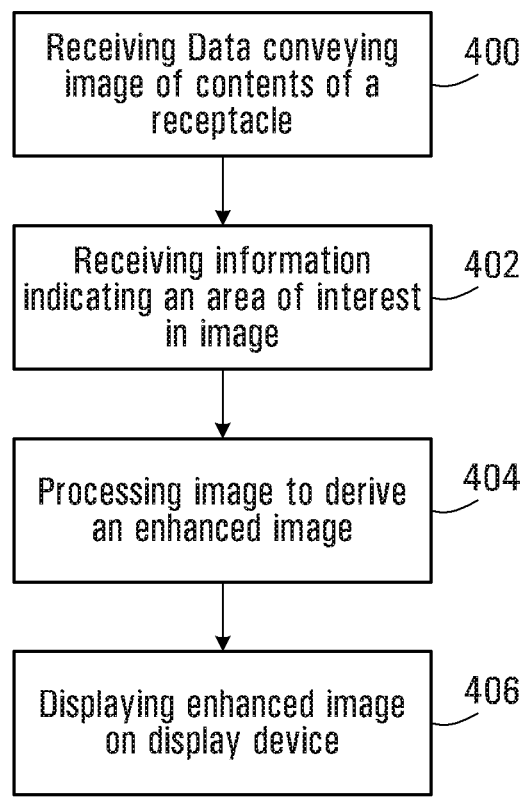
FIG. 4 shows a flow diagram depicting a process for facilitating visual identification of a prohibited object in an image during security screening.

The apparatus 200 implements a user interface module for facilitating visual identification of a prohibited object in an image during security screening. A specific example of a method implemented by the apparatus 200 will now be described with reference to FIG. 4. At step 400, data is received conveying an image of the contents of a receptacle derived from an apparatus that scans the receptacle with penetrating radiation such as the image generation apparatus 102 depicted in FIG. 1. At step 402, information is received from an automated threat detection processor (such as automated threat detection processor 106 depicted in FIG. 1) indicating an area of interest in the image potentially containing a prohibited object. At step 404, the image received at step 400 is processed the image to generate an enhanced image. In a first example of implementation, at step 404 portions of the image outside the area of interest, conveyed by the information received at step 402, are visually de-emphasized. In a second example of implementation, at step 404 features appearing inside the area of interest, conveyed by the information received at step 402 are visually emphasized. In yet another example, at step 404, the portions of the image outside the area of interest are visually de-emphasized and features appearing inside the area of interest are visually emphasized. At step 406 the enhanced image is caused to be displayed on a display module.

As depicted in FIG. 3, the apparatus 200 suitable for implementing the above described process includes a first input 304, a second input 306, a processing unit 300 and an output 310. Optionally, as depicted in FIG. 3, the apparatus 200 further includes a user input 308.

The first input 304 is for receiving data conveying an image of the contents of a receptacle derived from an apparatus that scans the receptacle with penetrating radiation. In a specific implementation, the image signal is derived from a signal generated by the image generation apparatus 102 (shown in FIG. 1).

The second input 306 is for receiving information from an automated threat detection processor indicating an area of interest in the image potentially containing a prohibited object. In a specific implementation, the information is provided by the automated threat detection processor 106. The type of information received at the second input 306 depends on the specific implementation of the automated threat detection processor 106 and may vary from one implementation to the next without detracting from the spirit of the invention. Examples of the type of information that may be received include information on the position of the prohibited object detected within the image, information about the level of confidence of the detection and data allowing identifying the prohibited object detected.

The user input 308, which is an optional feature, is for receiving signals from a user input device, the signals conveying commands for controlling the type information displayed by the user interface module or for annotating the information displayed. Any suitable user input device for providing user commands may be used such as, for example, a mouse, keyboard, pointing device, speech recognition unit or touch sensitive screen.

The processing unit 300 is in communication with the first input 304, the second input 306 and the user input 308 and implements a user interface module for facilitating visual identification of a prohibited object in an image of contents of a receptacle.

More specifically, the processing unit 300 is adapted for processing the image received at the first input 304 to generate an enhanced image based at least in part on the information received at the second input 306 and optionally on commands received at the user input 308.

In a specific non-limiting example of implementation, the processing unit 300 is adapted for generating an image mask on the basis of the information received indicating an area of interest in the image. The image mask includes a first enhancement area corresponding to the area of interest and a second enhancement area corresponding to portions of the image outside the area of interest. The image mask allows applying a different type of image enhancement processing to portions of the image corresponding to the first enhancement area and the second enhancement area to generate an enhanced image.

FIGS. 13a to 13g depict various illustrative examples of images and corresponding enhanced images generated by the processing unit 300 in accordance with specific examples of implementation of the invention.

Figure 13B:
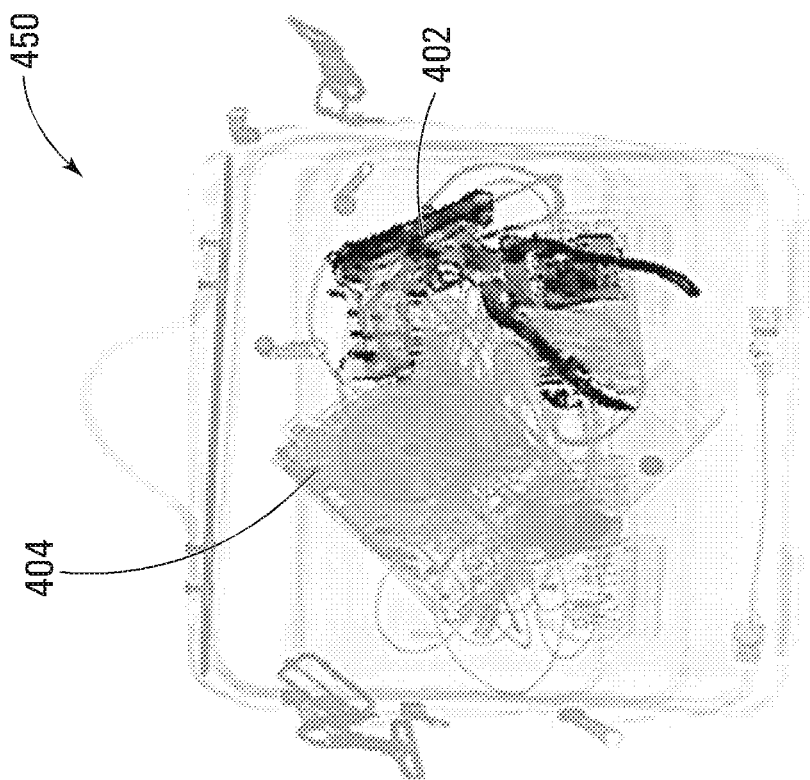
FIGS. 13a and 13b depict a first example of an original image conveying contents of a receptacle and a corresponding enhanced image in accordance with a specific example of implementation of the present invention.
Figure 13A:
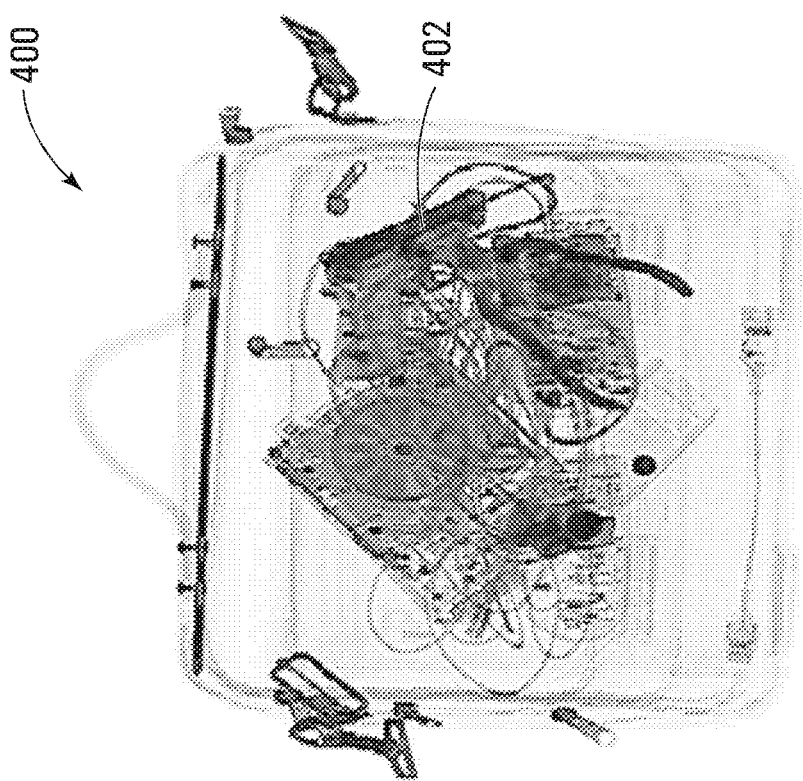

FIG. 13a depicts a first exemplary image 400 conveying contents of a receptacle that was generated by an x-ray machine. The processing unit 300 processes the first exemplary image 400 to derive information conveying an area of interest, denoted as area of interest 402 in the figure. FIG. 13b depicts an enhanced version of the image of FIG. 13a, herein referred to as enhanced image 450 resulting from the application of an image mask include ant enhancement area corresponding to the area of interest 402. In the example shown, the enhanced image 450 is such that portions 404 of the image which lie outside the area of interest 402 have been visually de-emphasized and features appearing inside the area of interest 402 have been visually emphasized.

Figures 13C, 13D:
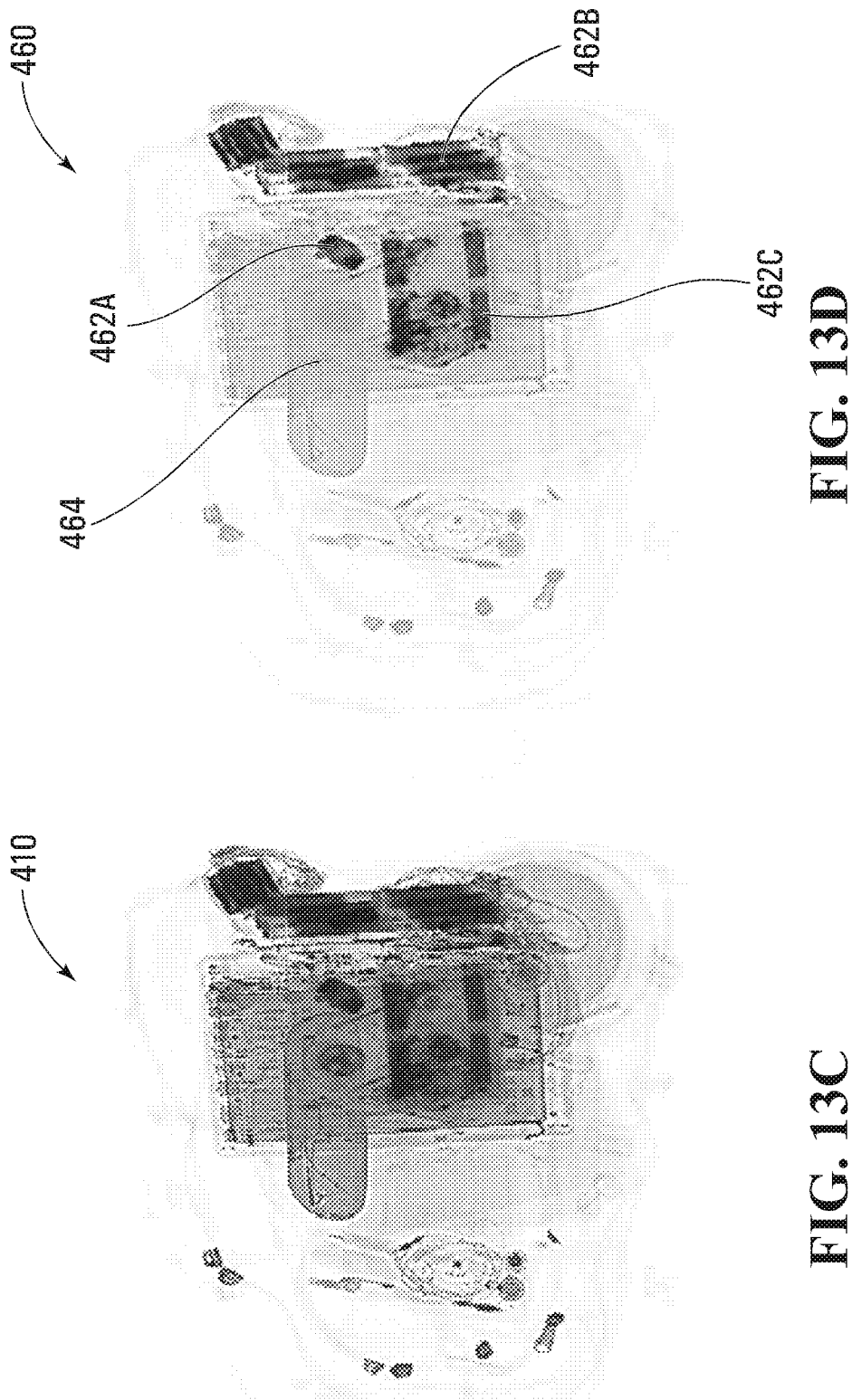
FIGS. 13c and 13d depict a second example of an original image conveying contents of a receptacle and a corresponding enhanced image in accordance with a specific example of implementation of the present invention.

FIG. 13c depicts a second exemplary image 410 conveying contents of another receptacle that was generated by an x-ray machine. The processing unit 300 processes the second exemplary image 410 to derive information conveying a plurality of areas of interest, denoted as areas of interest 462a 462b and 462c in the figure. FIG. 13d depicts an enhanced version of the image of FIG. 13c, herein referred to as enhanced image 460. In the example shown, the enhanced image 450 is such that portions 464 of the image which lie outside the areas of interest 462a 462b and 462c have been visually de-emphasized and features appearing inside the areas of interest 462a 462b and 462c have been visually emphasized.

Figure 13F:
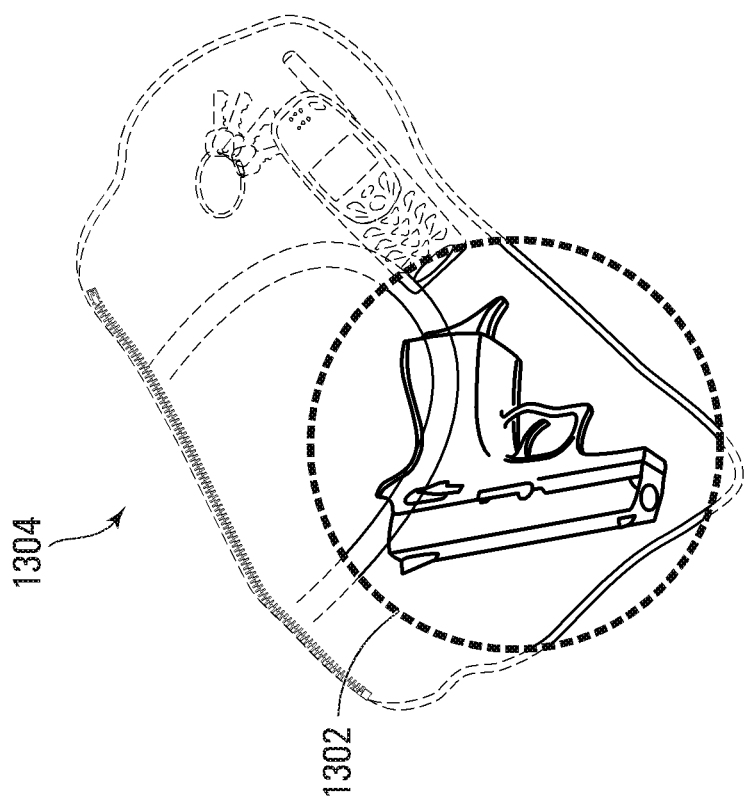
FIGS. 13e, 13f and 13g depict a third example of an original image conveying contents of a receptacle and two (2) corresponding enhanced images in accordance with a specific example of implementation of the present invention.
Figure 13E:
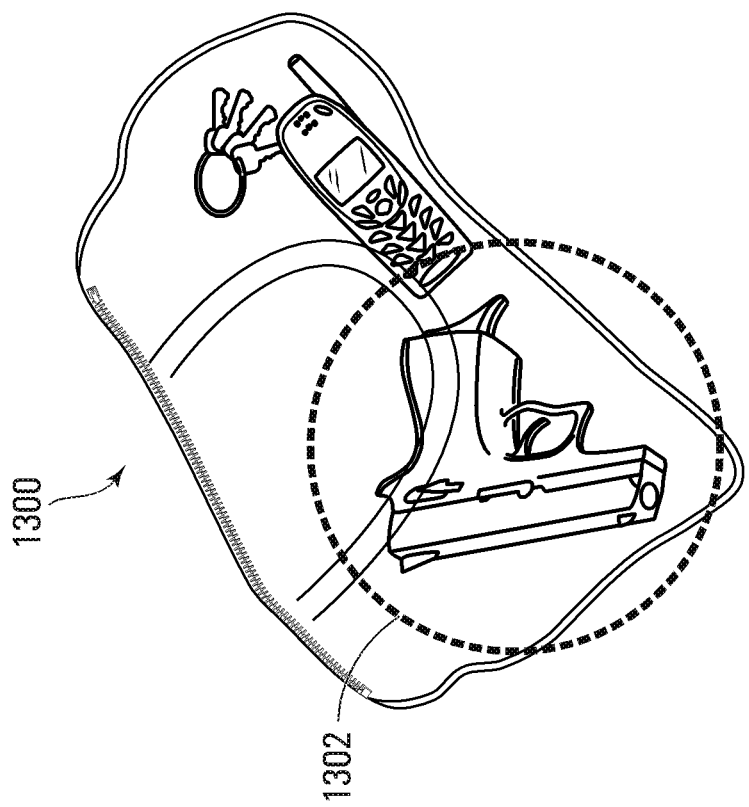
Figure 13G:
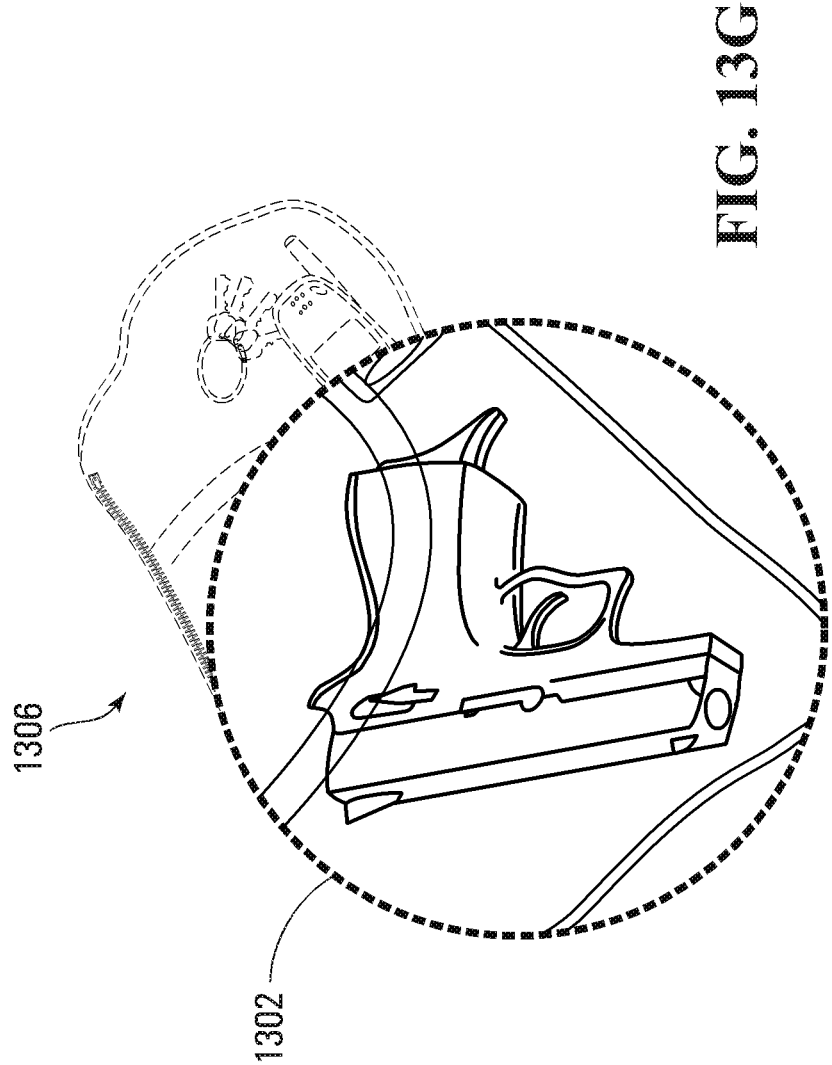

FIG. 13e depicts a third example of an illustrative image 1300 conveying contents of a receptacle. The processing unit 300 processes the image 1300 to derive information conveying an area of interest, denoted as area of interest 1302 in the figure. FIG. 13f depicts a first enhanced version of the image of FIG. 13e, herein referred to as enhanced image 1304. In the example shown, the enhanced image 1304 is such that portions of the image which lie outside the area of interest 1302 have been visually de-emphasized. The de-emphasis is illustrated in the figure by the features appearing in portions of the image that lie outside the area of interest being presented in dotted lines. FIG. 13g depicts a second enhanced version of the image of FIG. 13e, herein referred to as enhanced image 1306. In the example shown, the enhanced image 1306 is such that features appearing inside the area of interest 1302 have been visually emphasized. The emphasis is illustrated in the figure by the features appearing in the area of interest being enlarged such that features of the enhanced image 1306 located inside the area of interest 1302 appear on a larger scale than features in portions of the enhanced image located outside the area of interest.

De-emphasizing Portions Outside the Area of Interest

In a first example of implementation, the processing unit 300 processes the image received at input 304 to generate an enhanced image wherein portions outside the area of interest, conveyed by the information received at second input 306, are visually de-emphasized. Any suitable image manipulation technique for de-emphasizing the visual appearance of portions of the image outside the area of interest may be used by the processing unit 300. Such image manipulation techniques are well-known in the art and as such will not be described in detail here.

In a specific example, the processing unit 300 processes the image to attenuate portions of the image outside the area of interest. In a non-limiting example, the processing unit 300 processes the image to reduce contrasts between feature information appearing in portions of the image outside the area of interest and background information appearing in portions of the image outside the area of interest. Alternatively, the processing unit 300 processes the image to remove features from portions of the image outside the area of interest. In yet another alternative embodiment, the processing unit 300 processes the image to remove all features appearing in portions of the image outside the area of interest such that only features in the areas of interest remain in the enhanced image.

In another example, the processing unit 300 processes the image to overlay or replace portions of the image outside the area of interest with a pre-determined visual pattern. The pre-determined visual pattern may be a suitable textured pattern of may be a uniform pattern. The uniform pattern may be a uniform color or other uniform pattern.

In yet another example, where the image includes color information, the processing unit 300 processes the image to modify color information associated to features of the image appearing outside the area of interest. In a non-limiting example of implementation, portions of the image outside the area of interest are converted into grayscale or other monochromatic color palette.

In yet another example of implementation, the processing unit 300 processes the image to reduce the resolution associated to portions of the image outside the area of interest. This type of image manipulation results in portions of the enhanced image outside the area of interest appearing blurred compare to portions of the image inside the area of interest.

In yet another example of implementation, the processing unit 300 processes the image to shrink portions of the image outside the area of interest such that at least some features of the enhanced image located inside the area of interest appear on a larger scale than features in portions of the enhanced image located outside the area of interest.

It will be appreciated that the above-described techniques for de-emphasizing the visual appearance of portions of the image outside the area of interest may be used individually or in combination with one another. It will also be appreciated that the above described exemplary techniques for de-emphasizing the visual appearance of portions of the image outside the area of interest are not meant as an exhaustive list of such techniques and that other suitable techniques may be used without detracting from the spirit of the invention.

Emphasizing Features Appearing Inside the Area of Interest

In a second example of implementation, the processing unit 300 processes the image received at input 304 to generate an enhanced image wherein features appearing inside the area of interest, conveyed by the information received at step 402 are visually emphasized. Any image manipulation suitable technique for emphasizing the visual appearance of features of the image inside the area of interest may be used. Such image manipulation techniques are well-known in the art and as such will not be described in detail here.

In a specific example, the processing unit 300 processes the image to increase contrasts between feature information appearing in portions of the image inside the area of interest and background information appearing in portions of the image inside the area of interest. For example, contour lines defining objects inside the area of interest are made to appear darker and/or thicker compared to the background. In a non-limiting example, contrast-stretching tools with settings highlighting the metallic content of portions of the image inside the area of interest are used to enhance the appearance of such features.

In another specific example, the processing unit 300 processes the image to overlay portions of the image inside the area of interest with a pre-determined visual pattern. The pre-determined visual pattern may be a suitable textured pattern of may be a uniform pattern. The uniform pattern may be a uniform color or other uniform pattern. In a non-limiting example, portions of the image inside the area of interest are highlighted by overlaying the area of interest with a brightly colored pattern. Preferably the visual pattern has transparent properties in that a user can see features of the image in portions of the image inside the area through the visual pattern once the pattern is overlaid in the image.

In another non-limiting example, the processing unit 300 processes the image to modify color information associated to features of the image appearing inside the area of interest. For example, colors for features of the image appearing inside the area of interest may be made to appear brighter or may be replaced by other more visually contrasting colors. In particular, color associated to metallic objects in an x-ray image may be made to appear more prominently by either replacing it with a different color or changing an intensity of the color. For example, the processing unit 300 may transform features appearing in blue inside the area of interest such that these same features appear in red in the enhanced image.

In another non-limiting example, processing unit 300 processes the image to enlarge a portion of the image inside the area of interest such that at least some features of the enhanced image located inside the area of interest appear on a larger scale than features in portions of the enhanced image located outside the area of interest. FIG. 13*g* of the drawings, previously described, depicts an enhanced image derived from the image depicted in FIG. 13*e* wherein the area of interest 1302 has been enlarged relative to the portions of the image outside the area of interest. The resulting enhanced image 1306 is such that the features inside the area of interest 1302 appear on a different scale that the features appearing in the portions of the image outside the area of interest 1302.

It will be appreciated that the above described techniques for emphasizing the visual appearance of portions of the image inside the area of interest may be used individually or in combination with one another or with other suitable techniques without detracting from the spirit of the invention. For example, processing the image may include modifying color information associated to features of the image appearing inside the area of interest and enlarging a portion of the image inside the area of interest. It will also be appreciated that the above described exemplary techniques for emphasizing portions of the image inside the area of interest are not meant as an exhaustive list of such techniques and that other suitable techniques may be used without detracting from the spirit of the invention.

Concurrently De-emphasizing Portions Outside the Area of Interest Emphasizing Features Inside the Area of Interest In addition, it will be appreciated that embodiments of the invention may also concurrently de-emphasize portions of the image outside the area of interest and emphasize features of the image inside the area of interest without detracting from the spirit of the invention.

Portions Surrounding the Area of Interest

Optionally, the processing unit 300 processes the image received at input 304 to modify portions of areas surrounding the area of interest to generate the enhanced image. In a specific example, the processing unit 300 modifies portions of areas surrounding the area of interest includes applying a blurring function to the edges surrounding the area of interest. In a specific example of implementation, the edges of the area of interest are blurred. Advantageously, blurring the edges of the area of interest accentuates the contrast between the area of interest and the portions of the image outside the area of interest.

Multiple Areas of Interest

It will be appreciated that, although the above described examples describe situations in which a single area of interest is conveyed by the information received from the automated threat detection processor 106, implementations of the invention adapted from processing information indicating a plurality of areas of interest in the image are within the scope of the invention. As such, the processing unit 300 is adapted for receiving at input 306 information from an automated threat detection processor, such as automated threat detection processor 106, indicating a plurality of areas of interest in the image potentially containing respective prohibited objects. The processing unit 300 then processes the image received at input 304 to generate the enhanced image. The processing of the image is performed using the same principles as those described above with reference to information conveying a single area of interest. The person skilled in the art will readily appreciate, in light of the present description, the manner in which the processing unit 300 may be adapted for processing information conveying a plurality of areas of interest without required further guidance.

Returning to FIG. 3, the output 310 is for releasing a signal for causing the output device 202 (shown in FIG. 2) to display the graphical user interface module implemented by processing unit 300. A graphical user interface module implemented by apparatus 200 in accordance with a specific example of implementation is described in greater detail herein below with reference to FIG. 5.

Graphical User Interface Module Example

Figure 5:
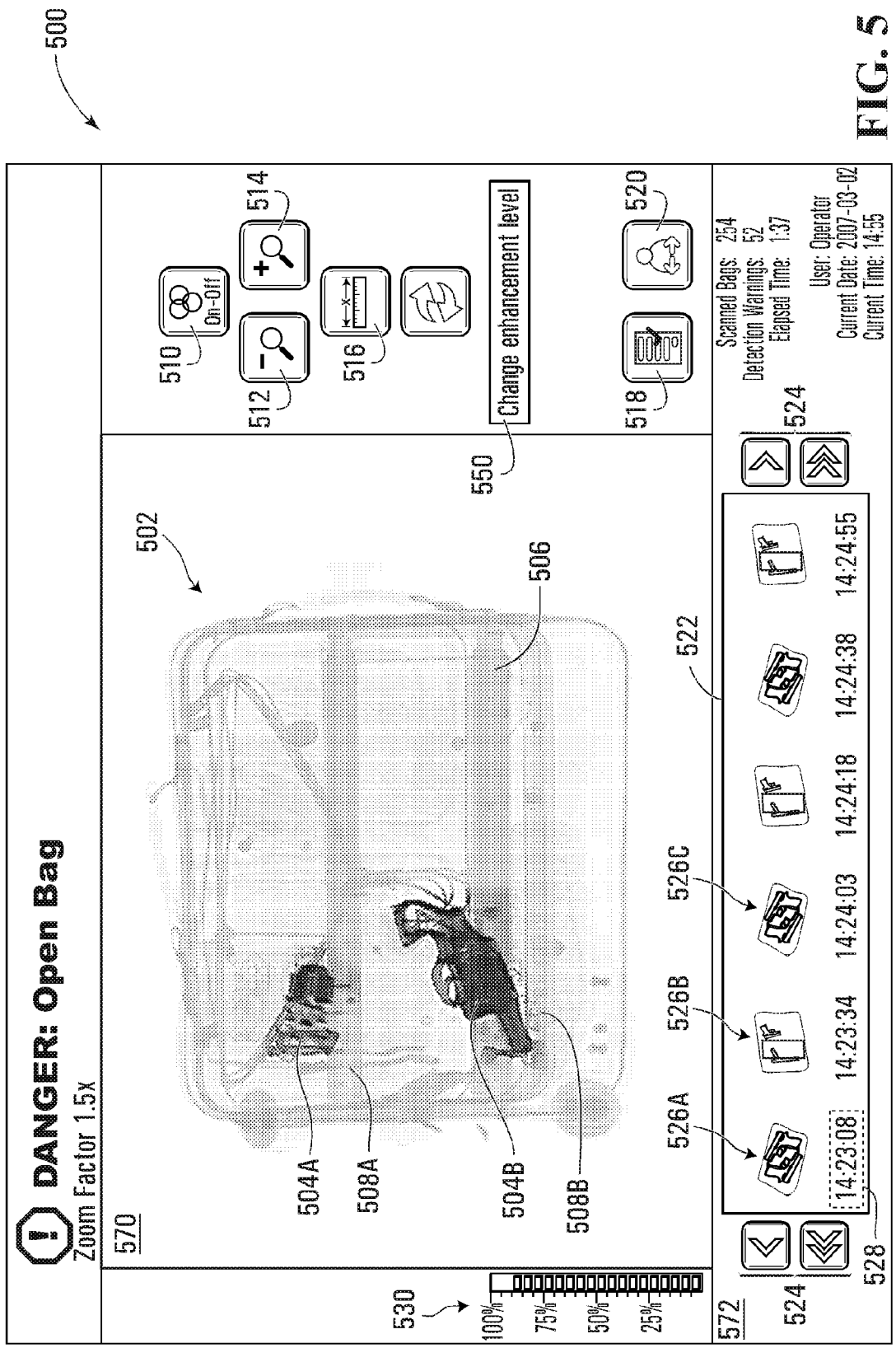
FIG. 5 depicts a viewing window of a user interface displayed by the output module of FIG. 2 in accordance with a specific example of implementation of the present invention.

With reference to FIG. 5, there is shown a display generated by a graphical user interface module implemented in accordance with a non-limiting implementation on the invention.

As depicted, the user interface module provides a viewing window 500 including a viewing space 570 for displaying an enhanced image 502 wherein areas of interest 504*a* and 504*b* are displayed to the user in a visually contrasting manner relative to portions of the image outside the areas of interest 506. In this fashion, an operator's attention can be focused on the areas interest 504*a* and 504*b* of the image which are the areas most likely to contain prohibited objects.

In the example depicted, portions of the image outside the areas of interest 504*a* and 504*b* have been de-emphasized. Amongst possible other processing, portions of the image outside the areas of interest 504*a* and 504*b*, generally designated with reference numeral 506, have been attenuated by reducing contrasts between the features and the background. These portions appear paler relative to the areas of interest 504*a* and 504*b*. In the example depicted, features depicted in the areas of interest 504*a* and 504*b* have also been emphasized by using contrast-stretching tools to increase the level of contrast between the features depicted in the areas of interest 504*a* and 504*b* and the background. Finally, as depicted in the figure, the edges 508*a* and 508*b* surrounding the area of interest 504*a* and 504*b* have been blurred to accentuates the contrast between the areas of interest 504*a* and 504*b* and the portions of the image outside the areas of interest 504*a* and 504*b*. The location of the areas of interest 504*a* and 504*b* was derived on the basis of the information received at input 306 (shown in FIG. 3) from the automated threat detection processor 106.

Optionally, the user interface module also provides a set of controls 510 512 514 516 550 518 and 520 for allowing a user to providing commands for modifying features of the graphical user interface module to change the appearance of the enhanced image 502 displayed in the viewing window 500.

In a specific implementation, the controls in the set of controls 510 512 514 516 550 518 allow the user to change the appearance of the enhanced image displayed in the viewing window 500 by using an input device in communication with the apparatus 200 (shown in FIG. 3) through user input 308. In the example depicted, the controls in the set of controls 510 512 514 516 550 518 are in the form of a buttons that can be selectively actuated by a user. Examples of user input devices include, without being limited to, a mouse, a keyboard, a pointing device, a speech recognition unit and a touch sensitive screen. In an alternative embodiment, the controls may be provided as a physical button (or key) on a keyboard or other input device that can be selectively actuated by a user. In such an implementation, the physical button (or key) is in communication with the apparatus 200 (shown in FIG. 3) through user input 308. Suitable forms of user controls other than buttons may also be used without detracting from the spirit of the invention.

It will be apparent that certain controls in the set of controls 510 512 514 516 550 518 may be omitted from certain implementations and that additional controls may be included in alternative implementations of a user interface without detracting from the spirit of the invention.

In the specific example of implementation depicted, functionality is provided to the user for allowing the latter to select for display in viewing window 500 the "original" image received at input 304 of apparatus 200 (shown in FIG. 3) or the enhanced image generated by apparatus 200. In a specific example, such functionality is enabled by displaying a control on the user interface allowing a user to effect the selection. In FIG. 5 this control is embodied as control button 510 which may be actuated by the user via a user input device to toggle between the enhanced image and the "original" image for display in viewing window 500. Other manners for providing such functionality will become readily apparent to the person skilled in the art in light of the present description and as such will not be described further here.

In the specific example of implementation depicted, functionality is also provided to the user for allowing the latter to select a level of enlargement from a set of possible levels of enlargement to be applied to the image in order to derive the enhanced image for display in the viewing window 500. The functionality allows the user to independently control the scale of features appearing in areas of interest 504a and 504b relative to the scale of features in portions of the image outside the areas of interest 504a and 504b. In a specific example, such functionality may be enabled by displaying a control on the user interface allowing a user to effect the selection of the level of enlargement. In FIG. 5 this control is embodied as control buttons 512 and 514 which may be actuated by the user via a user input device. In the example depicted, by actuating button 514, the enlargement factor ("zoom-in") to be applied to the areas of interest 504a and 504b by the processing unit 300 (shown in FIG. 3) is increased and by actuating button 512 the enlargement factor ("zoom-out") to be applied to the areas of interest 504a and 504b is decreased. It will be readily apparent to the person skilled in the art that other type of controls for allowing a user to select a level of enlargement from a set of levels of enlargement may be envisaged without detracting from the spirit of the invention. In a specific example of implementation, the set of possible levels of enlargement includes at least two levels of enlargement. In a non-limiting example, one of the levels of enlargement is a "NIL" level wherein features of the portion of the enhanced image inside the area of interest appear on a same scale as features in portions of the enhanced image outside the area of interest. In other examples of implementation, the set of possible levels of enlargement includes two or more distinct levels of enlargement other that the "NIL" level. The enhanced image is such that portions inside the areas of interest are enlarged at least in part based on the selected level of enlargement. It will also be appreciated that although the above refers to a level of "enlargement" to be applied to the areas of interest 504a and 504b, a corresponding level of "shrinkage" may instead be applied to portions of the image outside the areas of interest 504a and 504b so that in the resulting enhanced image features in the areas of interest appear on a larger scale than portions of the image outside the area of interest. Other manners for providing such functionality will become readily apparent to the person skilled in the art in light of the present description and as such will not be described further here.

In another specific example of implementation, not depicted in the figure, functionality is also provided to the user for allowing the latter to select a zoom level to be applied to derive the enhanced image 502 for display in the viewing window 500. The functionality allows the user to change the zoom amount to be applied to the image depicted in the viewing space of viewing window 500. This zoom level functionality differs from the level of enlargement functionality described above, and enabled by buttons 512 and 514, in that the zoom level functionality affects the entire image with a selected zoom level. In other words, modifying the zoom level does not affect the relative scale between the areas of interest and portions of the image outside the area of interest remains. In a specific example, such functionality may be enabled by displaying a control on the user interface allowing a user to effect the selection of the zoom level. Any suitable type of control for allowing a user to select a zoom level may be envisaged in specific implementations of the user interface module.

In the specific example of implementation depicted, functionality is also provided to the user for allowing the latter to select a level of enhancement from a set of possible levels of enhancement. The functionality allows the user to independently control the type of enhancement to be applied to the original image to generate the enhanced image for display in the viewing window 500. In a specific example of implementation, the set of possible levels of enhancement includes at least two levels of enhancement. In a non-limiting example, one of the levels of enhancement is a "NIL" level wherein the areas of interest are not emphasized and the portions of the images outside the areas of interest are not de-emphasized. In other examples of implementation, the set of possible levels of enlargement includes two or more distinct levels of enhancement other that the "NIL" level. In a specific example of implementation, each level of enhancement in the set of levels of enhancement is adapted for causing an enhanced image to be derived wherein:

portions inside the areas of interest are visually emphasized at least in part based on the selected level of enhancement; or portions outside the areas of interest are visually de-emphasized at least in part based on the selected level of enhancement; or portions inside the areas of interest are visually emphasized and portions outside the areas of interest are visually de-emphasized at least in part based on the selected level of enhancement.

For example, the different levels of enhancement may cause the processing unit 300 to apply different types of image processing functions or different degrees of image processing such as to modify the appearance of the enhanced image depicted in the viewing window 500. Advantageously, this allows the user to adapt the appearance of the enhanced image 502 based on either user preferences or in order to view an image in a different manner to facilitate visual identification of a prohibited object. In a specific example, the above-described functionality may be enabled by providing a control on the user interface allowing a user to effect the selection of the level of enhancement. In FIG. 5 this control is embodied as control button 550 which may be actuated by the user via a user input device. In the example depicted, by actuating button 550 the type of enhancement to be applied by the processing unit 300 (shown in FIG. 3) is modified based on a set of predetermined levels of enhancement. In an alternative implementation, not shown in the figures, a control in the form of a drop-down menu providing a set of possible levels of enhancement is provided. The user is able to select a level of enhancement from the set of levels of enhancement to modify the type of enhancement to be applied by the processing unit 300 (shown in FIG. 3) to generate the enhanced image. It will be readily apparent to the person skilled in the art that other type of controls for allowing a user to select a level of enhancement from a set of levels of enhancement may be envisaged without detracting from the spirit of the invention.

In a specific example of implementation, not shown in the figures, functionality is also provided to the user for allowing the latter to independently control the amount of enhancement to be applied to the area(s) of interest of the images and the amount of enhancement to be applied to portions of the image outside of the area(s) of interest. In a specific example, the above-described functionality may be enabled by providing on a user interface a first user control for enabling the user to select a first selected level of enhancement, and a second user control is provided for allowing a user to select a second level of enhancement. The processing unit generates the enhanced image such that:

portions inside the area of interest are visually emphasized at least in part based on the selected second level of enhancement; and
  portions outside the area of interest are visually de-emphasized at least in part based on the selected first level of enhancement.

Figure 6:
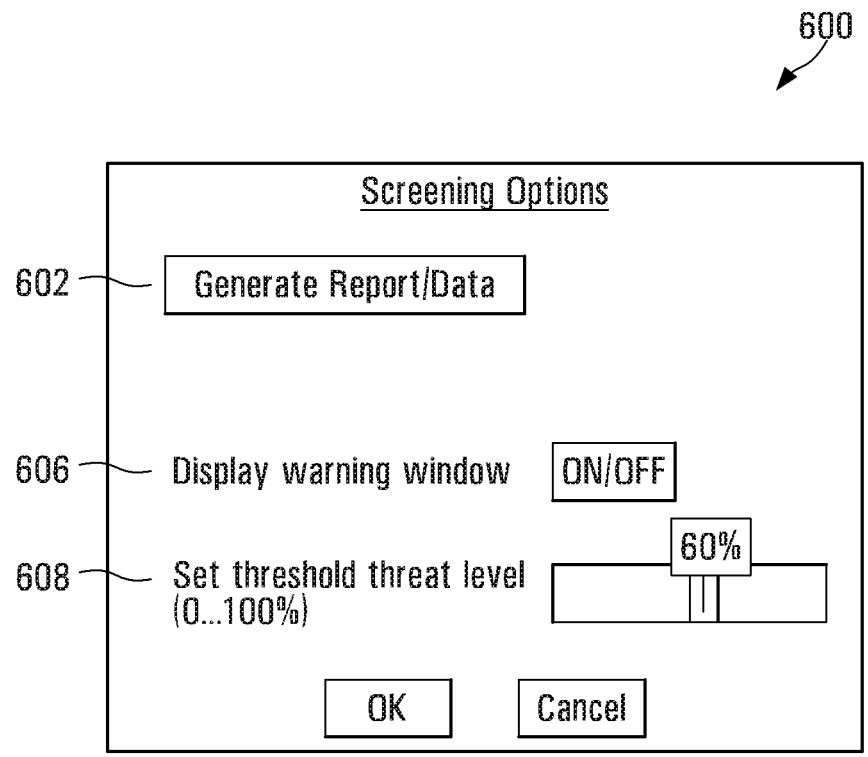
FIG. 6 depicts a control window of a user interface module displayed by the apparatus of FIG. 3 allowing a user to configure screening options in accordance with a specific example of implementation of the present invention.

Optionally still, the user interface module is adapted for displaying a control 518 for allowing a user to modify other configuration elements of the user interface. In accordance with a non-liming specific implementation, actuating control 518 causes the user interface module to displays a control window 600 of the type depicted in FIG. 6 allowing a user to select screening options. In the specific example depicted, the user is enabled to select between the following screening options:

Generate a report data 602: this option allows a report to be generated detailing information associated to the screening of the receptacle. In the example depicted, this is done by providing a control in the form of a button that can be toggled between an "ON" state and an "OFF" state. It will be readily apparent that other suitable forms of controls may also be used without detracting from the spirit of the invention. The information generated in the report may include, without being limited to, time of the screening, identification of the security personnel operating the screening system, identification of the receptacle and/or receptacle owner (e.g. passport number in the case of a customs screening), locations information, area of interest information, confidence level information, identification of the prohibited object detected and description of the handling that took place and the results of the handling amongst others. Advantageously, this report allows a tracking of the screening operation.

Display warning window 606: this option allows a user to cause a visual indicator in the form of a warning window to be removed from or displayed on the user interface module when a prohibited object is detected in a receptacle.

Set threshold sensitivity/confidence level 608: this option allows a user to modify the detection sensitivity level of the screening system. In specific implementations, this may be done by providing a control in the form of a text box, sliding ruler (as shown in the figure), selection menu or other suitable type of control allowing the user to select between a range of detection sensitivity levels. It will be readily apparent that other suitable forms of controls may also be used without detracting from the spirit of the invention.

The person skilled in the art in light of the present description will readily appreciate that other options may be provided to the user and that certain options described above may be omitted from certain implementations without detracting from the spirit of the invention. As a variant, certain options may be selectively provided to certain users or, alternatively, may require a password to be modified. For example, the setting threshold sensitivity/confidence level 608 may only be made available to user having certain privileges (examples screening supervisors or security directors). As such, the user interface module may include some type of user identification functionality, such as a login process, to identify the user of the screening system. Alternatively, the user interface module, upon selection by the user of the setting threshold sensitivity/confidence level 608 option, may prompt the user to enter a password for allowing the user to modify the detection sensitivity level of the screening system.

Optionally still, the user interface module is adapted for displaying a control 520 for allowing a user to login/log-out of the system in order to provide user identification functionality. Manners in which user identification functionality can be provided are well-known in the art and are not critical to the present invention and as such will not be described further here.

Optionally still, not shown in the figures, the user interface module is adapted to allow the user to add complementary information to the information being displayed on the user interface. In a specific example of implementation, the user is enabled to insert markings in the form of text and/or visual indicators in the image displayed on the user interface. The marked-up image may then be transmitted to a third party location, such as a checking station, so that the checking station is alerted to verify the marked portion of the receptacle to locate a prohibited object. In such an implementation, the user input 308 (depicted in FIG. 3) receives signals from a user input device, the signals conveying commands for marking the image displayed in the user interface. Any suitable user input device for providing user commands may be used such as, for example, a mouse, keyboard, pointing device, speech recognition unit or touch sensitive screen. The specific manner in which the functionality for marking the image is provided is not critical to the present invention and as such will not be described further here.

Previously Screened Receptacles

In accordance with a specific example of implementation, apparatus 200 shown in FIG. 3 is adapted for storing information associated with receptacles so that this information may be accessed at a later time. More specifically, for a given receptacle, the apparatus 200 is adapted for receiving at first input 304 data conveying an image of the contents of the receptacle derived from an apparatus that scans the receptacle with penetrating radiation and at second input 306 information from an automated threat detection processor indicating an area of interest in the image potentially containing a prohibited object. The processing unit 300 of apparatus 200 is adapted for generating a record associated to the screened receptacle. The record includes the image of the contents of the receptacle received at the first input 304 and the information received at second input 306. Optionally, the record may also include additional information such as for example a time stamp, identification data conveying the type of prohibited object potentially detected, the level of confidence of the detection, a level of risk data element, an identification of the screener, the location of the screening station, identification information associated to the owner of the receptacle and/or any other suitable type of information that may be of interest to a user of the system for later retrieval. The record is then stored in memory 350 for later access.

The generation of a record may be effected for all receptacles being screened or for selected receptacles only. In practical implementations of the inventions, in particular in areas where traffic levels are high and a large number of receptacles are screened, it may be preferred to selectively store the images of the receptacles rather than storing images for all the receptacles. The selection of which images to store may be effected by the user of the user interface by providing a suitable control on the user interface for receiving user command to that effect. Alternatively, the selection of which images may be effected in the basis of information received from the automated threat detection processor 106. For example, a record may be generated for a given object when a prohibited object was potentially detected in the receptacle as could be conveyed by a signal received from the automated threat detection processor 106.

Figure 7:
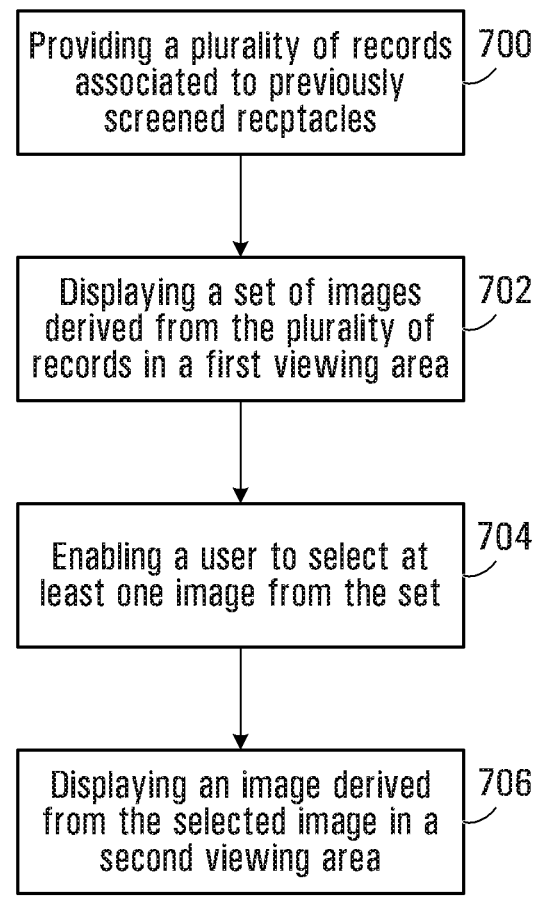
FIG. 7 is a flow diagram depicting a process for facilitating visual identification of prohibited objects in images associated with previously screened receptacles in accordance with a specific example of implementation of the present invention.

A process for facilitating visual identification of prohibited objects in images associated with previously screened receptacles is depicted in FIG. 7 of the drawings.

As shown, at step 700, a plurality of records associated to previously screened receptacles are provided. In a non-limiting example of implementation, apparatus 200 enables step 700 by providing the memory 350 for storing a plurality of records associated to respective previously screened receptacles. As described above, each record includes an image of the contents of a receptacle derived from an apparatus that scans the receptacle with penetrating radiation and information derived from an automated threat detection processor and indicating an area of interest in the image potentially containing a prohibited object.

At step 702, a set of thumbnail images derived from the plurality of records is displayed in viewing space 572. In a specific example of implementation, processing unit 300 is adapted for displaying a set of thumbnail images 522 in viewing space 572, each thumbnail image 526a 526b 526c in the set of thumbnail images 522 being derived from a record in the plurality of records stored in memory unit 350 (shown in FIG. 3).

At step 704 a user in enabled to select at least one thumbnail image from the set of thumbnail images 522. The selection may be effected on the basis of the images themselves or by allowing the user to specify either a time or time period associated to the records. In the specific example depicted, the user can select thumbnail image from the set of thumbnail images 522 using a user-input device to actuate the desired thumbnail image. Any suitable user input device for providing user commands may be used such as, for example, a mouse, keyboard, pointing device, speech recognition unit or touch sensitive screen.

At step 706, an enhanced image derived from a record corresponding to the selected thumbnail image is displayed in a second viewing space 570. More specifically, in response to a selection of a thumbnail image from the set of thumbnail images, an enhanced image derived from the certain record corresponding to the selected thumbnail image is displayed in viewing space 570. When multiple thumbnail images are selected, the corresponding enhanced images may be displayed concurrently with another or may be displayed separately in viewing space 570.

The enhanced imaged derived from the certain record corresponding to the selected thumbnail image may be derived in a similar manner as that described previously in the present specification. For example, for a given record in the database of records including a certain image and information conveying a certain area of interest in the image, portions of the certain image outside the certain area of interest may be visually de-emphasized to generate the enhanced image. In a second example of implementation, features appearing inside the certain area of interest are visually emphasized to generate the enhanced image. In yet another example, the portions of the image outside the certain area of interest are visually de-emphasized and features appearing inside the certain area of interest are visually emphasized to generate the enhanced image. The manner in which the portions of the certain image outside the certain area of interest may be visually de-emphasized and features appearing inside the certain area of interest may visually emphasized have been previously described in the present applicable and as such will not be described further here.

In the specific example of implementation depicted, functionality is also provided to the user for allowing the latter to scroll through a plurality of thumbnail images so the different sets of the thumbnail images may be displayed in viewing space 572. In a specific example, such functionality may be enabled by displaying a control on the user interface allowing a user to scroll through plurality of thumbnail images. In FIG. 5 this control is embodied as scrolling controls 524 which may be actuated by the user via a suitable user input device.

Optionally, each thumbnail image in the set of thumbnail images conveys information derived from an associated time stamp data element. In the example depicted in FIG. 5, this is done by displaying timing information 528. Optionally, not shown in the figures, each thumbnail image in the set of thumbnail images conveys information derived from an associated level of risk data element. It will be readily apparent to the person skilled in the art that any suitable additional type of information may be displayed or conveyed in connection with the thumbnail images without detracting from the spirit of the invention.

Optionally, the user interface module implemented by apparatus 200 (shown in FIG. 2) includes functionality for enabling a user to select between an enhanced image associated to a previously screened receptacle, herein referred to as enhanced previous image, and an enhanced image associated with a receptacle currently being screened. The selected image is then displayed in viewing space 570. More specifically, data conveying a current image of the contents of a currently screened receptacle derived from an apparatus that scans the currently screened receptacle with penetrating radiation is received at first input 304 of apparatus 200 (shown in FIG. 2). In addition, information from an automated threat detection processor indicating an area of interest in the current image potentially containing a prohibited object is received at second input 306 of apparatus 200 (also shown in FIG. 2). The processing unit 300 is adapted for processing the current image to generate an enhanced current image in which portions outside the area of interest are visually de-emphasized. The user interface module enables the user to select between an enhanced previous image and the enhanced current image by providing a user operable control (not show in the figures) to effect the selection.

Optionally, as depicted in FIG. 5, functionality is provided for conveying a perceived level of threat associated to a receptacle. In a specific example of implementation, this perceived level of threat is derived based on a confidence level data element received from an automated threat detection processor such as automated threat detection processor 106 depicted in FIG. 1. The confidence level conveys a likelihood that a threat was positively detected in the receptacle. The perceived level of threat may be the confidence level or may be conditioned on the basis of external actors such as a national emergency status for example. In the embodiment depicted, the perceived level of threat is conveyed through the use of a graphical threat probability scale 590 including various graduated levels of threats. In addition, in the embodiment depicted, the perceived level of threat is also conveyed through the use of a message at the top of the screen. The message to be displayed is conditioned on the basis of the confidence level and on the basis of a threshold sensitivity/confidence level. As described above, the threshold/sensitivity level may be a parameter of the user interface configurable by the user or may be a predetermined value. In a specific example, if the confidence level exceeds the threshold sensitivity/confidence level, a warning message of the type: "DANGER: OPEN BAG" or "SEARCH REQUIRED" may be displayed. If the confidence level is below the threshold sensitivity/confidence level, either no message may be displayed or an alternative message of the type" NO THREAT DETECTED—SEARCH AT YOUR DISCRETION" may be displayed.

Automated Threat Detection Processor 106

Figure 8:
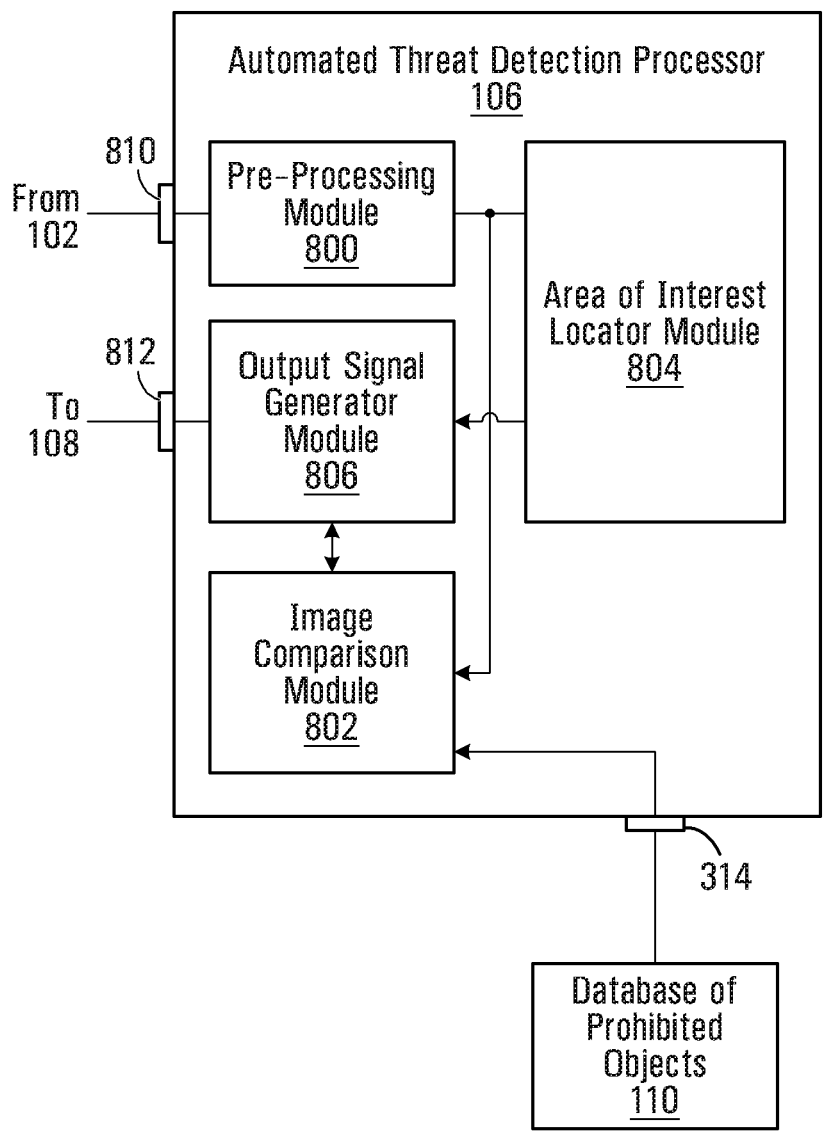
FIG. 8 is a block diagram of an automated threat detection processor suitable for use in connection with the system depicted in FIG. 1 in accordance with a specific example of implementation of the present invention.

The automated threat detection processor 106 shown in FIG. 1 will now be described in greater detail with reference to FIG. 8. As depicted, the automated threat detection processor 106 includes a first input 810, a second input 814, an output 812 and a processing unit, generally comprising a pre-processing module 800, an image comparison module 802, an area of interest locator module 804 and an output signal generator module 806.

In a specific example of implementation if the invention, either one or both of the region of the interest locator module 804 and the image comparison module 802 may generate information conveying an area of interest. In a non-limiting example of implementation, the area of interest locator module 804 is adapted for generating information conveying one or more regions of interest based on characteristics inherent to the image conveying contents of a receptacle. In a non-limiting example of implementation where the image is an x-ray image, the characteristics inherent to the image include, without being limited to, density information conveyed by an x-ray type image example. Conversely, in this non-limiting example of implementation, the image comparison module 802 is adapted for generating information conveying one or more regions of interest based on a comparison between the image conveying contents of a receptacle and images in a database of target objects. It will readily appreciated that specific examples of implementation of the may omit either one of the image comparison module 802 and the area of interest locator module 804 for implementing the functionality for generating information conveying an area of interest the without detraction from the spirit of the invention.

The first input 810 is for receiving data conveying an image of the contents of a receptacle from the image generation apparatus 102 (shown in FIG. 1).

The second input 814 is for receiving target images from the database of prohibited objects 110. It will be appreciated that in embodiments where the database of prohibited objects 110 is part of automated threat detection processor 106, the second input 314 may be omitted.

The output 312 is for releasing information for transmittal to output module 108 indicating an area of interest in the image potentially containing a prohibited object. Optionally, the information released also conveys a level of confidence that the area of interest contains a prohibited object as well as the identity of the prohibited object potentially detected.

The processing unit of the automated threat detection processor 106 receives the data conveying an image of the contents of the receptacle 104 from the first input 810 and processes that image to derive an area of interest in the image and, optionally, to identify a prohibited object in the receptacle 104. The processing unit of the automated threat detection processor 106 generates and releases at output 812 information conveying an area of interest in the image an optionally information conveying the identity of a detected prohibited object.

Figure 9:
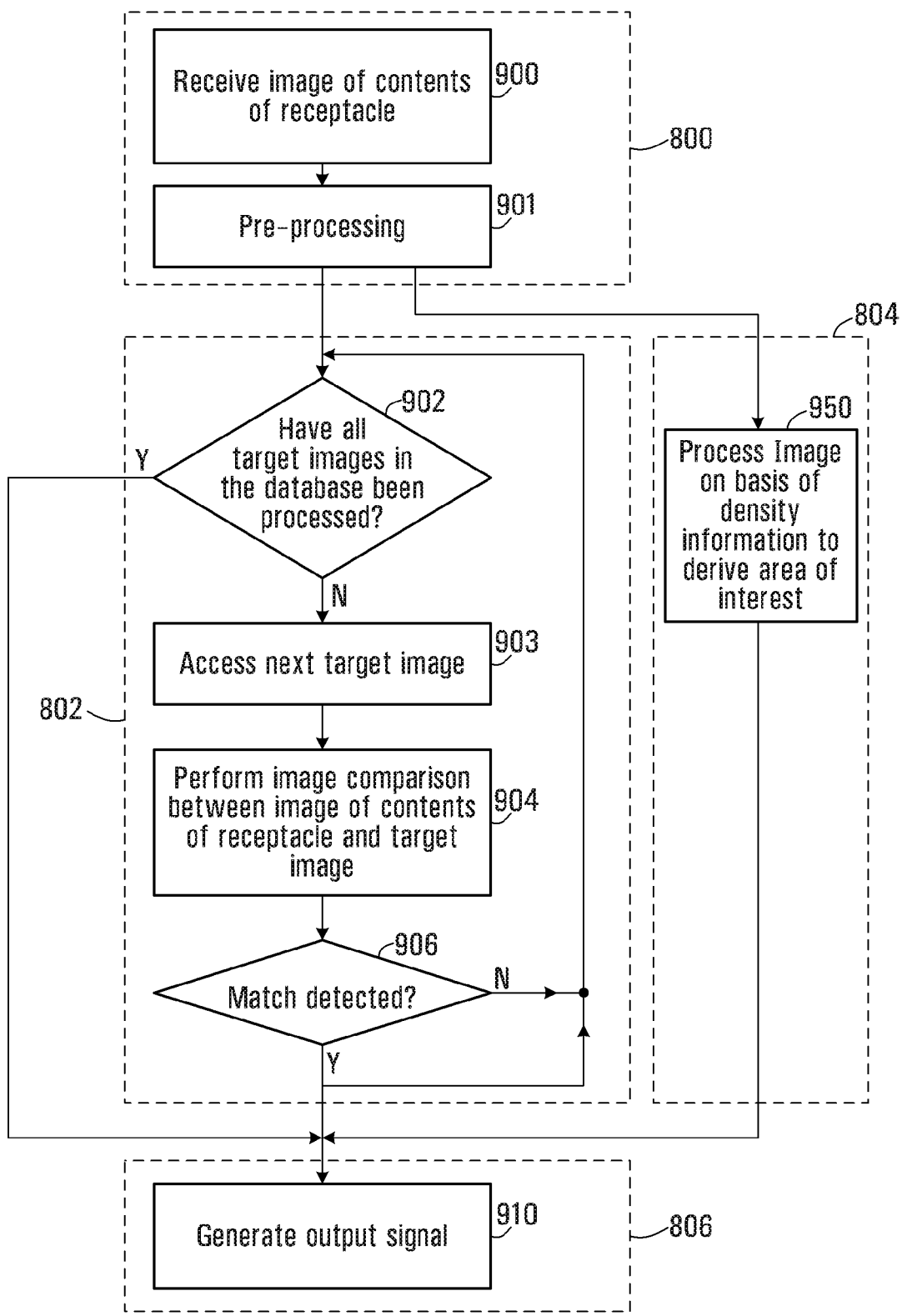
FIG. 9 is a flow diagram of a process suitable to be implemented by the automated threat detection processor depicted in FIG. 8 in accordance with specific examples of implementation of the present invention.

The process implemented by the various functional elements of the processing unit of the automated threat detection processor 106 is depicted in FIG. 9 of the drawings. At step 900, the pre-processing module 800 receives the data conveying an image of the contents of the receptacle 104 via the first input 810. At step 901, the pre-processing module 800 processes the data in order to enhance the image, remove extraneous information therefrom and remove noise artifacts in order to obtain more accurate comparison results.

The complexity of the requisite level of pre-processing and the related trade-offs between speed and accuracy depend on the application. Examples of pre-processing may include, without being limited to, brightness and contrast manipulation, histogram modification, noise removal and filtering amongst others. It will be appreciated that all or part of the functionality of the pre-processing module 800 may actually be external to the automated threat detection processor 106, e.g., it may be integrated as part of the image generation apparatus 102 or as an external component. It will also be appreciated that the pre-processing module 800 (and hence step 901) may be omitted in certain embodiments of the present invention without detracting from the spirit of the invention. As part of step 901, the pre-processing module 800 releases data conveying a modified image of the contents of the receptacle 104 for processing by the image comparison module 802 and by the area of interest locator module 804.

At step 950, the area of interest locator module 804 processes the data conveying the modified image received from the pre-processing module 800 (or the data conveying an image of the contents of the receptacle received via the first input 810) to generate information conveying an area of interest in the image. The area of interest in the image is an area that potentially contains a prohibited object. Any suitable method to determine an area of the image of (or modified image of) contents of a receptacle that potentially contains a prohibited object may be used. In a specific example, the area of interest locator module 804 is adapted for generating information conveying area of interest based on characteristics inherent to the input image. In a first specific example of implementation, the image is an x-ray image conveying information related to the material density associated to contents of the receptacle. The area of interest locator module 804 is adapted to process the image and identify areas including a certain concentration of elements characterized by a certain material density, say for example metallic-type elements, and label these areas as areas of interest. Characteristics such as the size of the area exhibited the certain density may also be taken into account to identify an area of interest. It will be apparent to the person skilled in the art that other suitable methods for identifying regions of interest in an image may be used. Many such methods are known in the art and as such will not be described further here.

At step 902, the image comparison module 802 verifies whether there remain any unprocessed target images in the database of prohibited objects 110. In the affirmative, the image comparison module 802 proceeds to step 903 where the next target image is accessed and the image comparison module 802 then proceeds to step 904. If at step 902 all target images in the database of prohibited objects 110 have been processed, the image comparison module 802 proceeds to step 908 and the process is completed.

At step 904, the image comparison module 802 compares the image (or modified image) of the contents of the receptacle 104 against the target image accessed at step 903 to determine whether a match exists. The comparison may be effected using any image processing algorithm suitable for comparing two images. Optionally, the comparison may make use of the area of interest information generated by the area of interest locator module to limit the comparison operation to the area of interest. Examples of algorithms that can be used to perform image processing and comparison include without being limited to:

A—Image Enhancement
Brightness and contrast manipulation
Histogram modification
Noise removal
Filtering
B—Image Segmentation
Thresholding
  Binary or multilevel
  Hysteresis based
  Statistics/histogram analysis
Clustering
Region growing
Splitting and merging
Texture analysis
Watershed
Blob labeling
C—General detection
Template matching
Matched filtering
Image registration
Image correlation
Hough transform
D—Edge Detection
Gradient
Laplacian
E—Morphological Image Processing
Binary
Grayscale
F—Frequency Analysis
Fourier Transform
Wavelets
G—Shape Analysis and Representations
Geometric attributes (e.g. perimeter, area, euler number, compactness)
Spatial moments (invariance)
Fourier descriptors
B-splines
Chain codes
Polygons
Quad tree decomposition
H—Feature Representation and Classification
Bayesian classifier
Principal component analysis
Binary tree
Graphs
Neural networks
Genetic algorithms
Markov random fields The above algorithms are well known in the field of image processing and as such will not be described further here.

In a specific example of implementation, the image comparison module 802 includes an edge detector to perform part of the comparison at step 904. In another specific example of implementation, the comparison performed at step 904 includes effecting a correlation operation between the image (or modified image) of contents of the receptacle and the target images in the database 110. In a specific example of implementation, the correlation operation is performed by an optical correlator. In an alternative example of implementation, the correlation operation is performed by a digital correlator. In yet another implementation, a combination of methods is used to effect the comparison of step 904. The results of the comparisons are then combined to obtain a joint comparison result.

The image comparison module 802 then proceeds to step 906 where the result of the comparison effected at step 904 is processed to determine whether a match exists between the image (or modified image) of the contents of receptacle 104 and the target image. In a specific example of implementation, the comparison at step 904 generates a score conveying a likelihood that there is a match between a portion of the image (or modified image) of the contents of receptacle 104 and the target image. A match is detected of the score obtained by the comparison at step 904 is above a certain threshold score. This score can also be considered as the confidence level associated to detection of a match. In the absence of a match, the image comparison module 802 returns to step 902. In response to detection of a match, the image comparison module 802 triggers the output signal generator module 806 to execute step 910. Then, the image comparison module 802 returns to step 902 to continue processing with respect to the next target image.

At step 910, the output signal generator module 806 generates information conveying the presence of a prohibited object in the receptacle 104, and the information is released at output 812. The information conveys positioning information associated to the prohibited object within the image received at input 810. The positioning information conveys an area of interest in the image where the prohibited object is potentially located which was derived either from the area of interest locator module 804 or the image comparison module 802. The information may be conveyed in any suitable format. In a non-limiting example, the information may convey a plurality of (X,Y) pixel locations defining an area in the image of the contents of a receptacle. In another non-limiting example of implementation, the information conveys an (X,Y) pixel location conveying the center of an area in the image. Optionally, the information released also conveys a level of confidence that the area of interest contains a prohibited object. Optionally still an identification of the prohibited object potentially detected in the image is also provided.

Alternative Embodiment

Screening of Persons

Although the above-described screening system was described in connection with screening of receptacles, the concepts described above can also be applied to the screening of people.

For example, in an alternative embodiment, a system for screening people is provided. The system includes components similar to those described in connection with the system depicted in FIG. 1. In a specific example of implementation, the image generation apparatus 102 is configured to scan a person and possibly to scan the person along various axes and/or views to generate multiple images associated to the person. The image or images associated with the person convey information related to the objects carried by the person. Each image is then processed in accordance with the method described in the present specification to facilitate visual identification of a prohibited object on the person.

Optionally, in the case of a system for screening people, database of prohibited objects 110 may further include entries associated to non-prohibited objects and/or objects that do not represent a potential threat. Such entries may be used to detect objects commonly carried by people such as cellphones, watches and rings, for example, which are not prohibited and not threatening. Advantageously, by identifying such objects unnecessary manual verifications can be avoided.

Specific Physical Implementation

Figure 10:
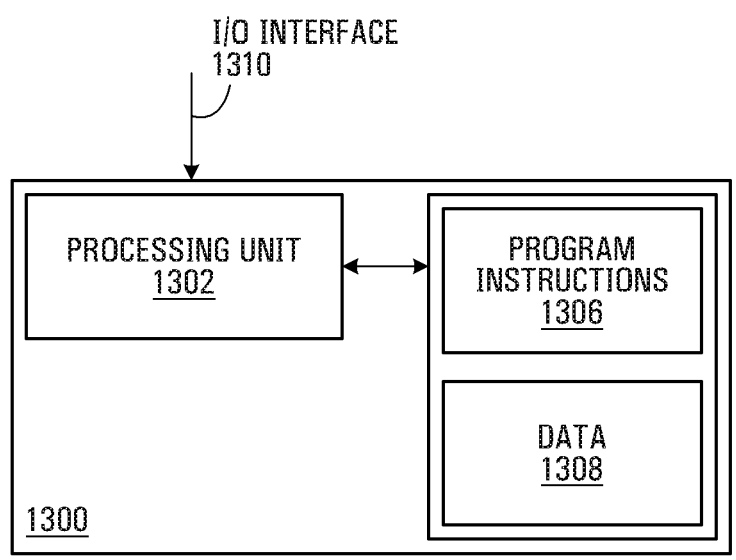
FIG. 10 is a block diagram of an apparatus suitable for implementing a user interface for facilitating visual identification of prohibited objects the images during security screening in accordance with a specific example of implementation of the present invention.

Certain portions of the apparatus 200 for implementing a user interface (shown in FIG. 3) can be implemented on a general purpose digital computer 1300, of the type depicted in FIG. 10, including a processing unit 1302 and a memory 1304 connected by a communication bus. The memory includes data 1308 and program instructions 1306. The processing unit 1302 is adapted to process the data 1308 and the program instructions 1306 in order to implement the functional blocks described in the specification and depicted in the drawings. The digital computer 1300 may also comprise an I/O interface 1310 for receiving or sending data elements to external devices.

Similarly, certain portions of the automated threat detection processor 106 can also be implemented on a general purpose digital computer having a similar structure as that described in connection with FIG. 10. Certain portions of the automated threat detection processor 106 and of the apparatus 200 for implementing a user interface may be implemented on a same general purpose digital computer without detracting from the spirit of the invention.

Alternatively, the above-described automated threat detection processor 106 can be implemented on a dedicated hardware platform where electrical/optical components implement the functional blocks described in the specification and depicted in the drawings. Specific implementations may be realized using ICs, ASICs, DSPs, FPGA, an optical correlator, digital correlator or other suitable hardware platform.

Figure 11:
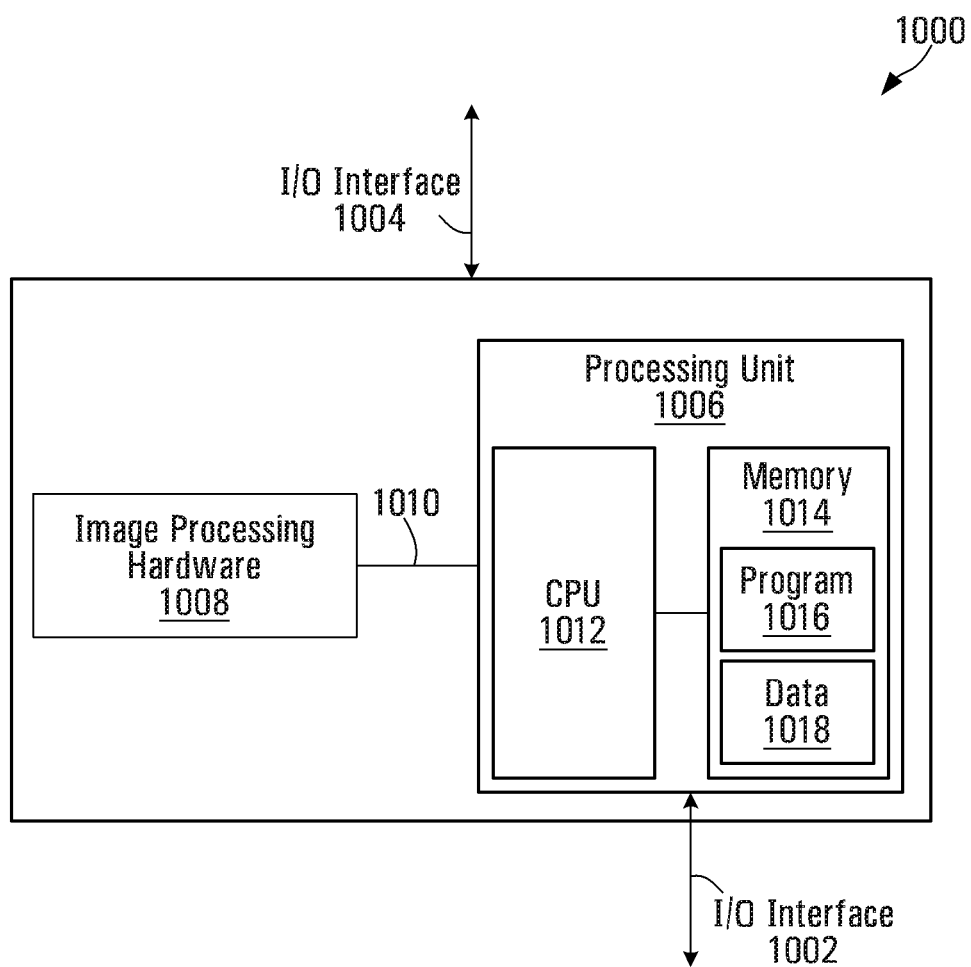
FIG. 11 is a block diagram of an apparatus suitable for implementing the automated threat detection processor depicted in FIG. 8 and for implementing a user interface for facilitating visual identification of prohibited objects the images during security screening in accordance with a specific example of implementation of the present invention.

Other alternative implementations of the automated threat detection processor 106 and the apparatus 200 for implementing a user interface can be implemented as a combination of dedicated hardware and software such as apparatus 1000 of the type depicted in FIG. 11. As shown, such an implementation comprises dedicated image processing hardware module 1008 and a general purpose computing unit 1006 including a CPU 1012 and a memory 1014 connected by a communication bus. The memory includes data 1018 and program instructions 1016. The CPU 1012 is adapted to process the data 1018 and the program instructions 1016 in order to implement the functional blocks described in the specification and depicted in the drawings. The CPU 1012 is also adapted to exchange data with the dedicated image processing hardware module 1008 over communication link 1010 to make use of the image processing capabilities of the dedicated image processing hardware module 1008. The apparatus 1000 may also comprise I/O interfaces 1002 1004 for receiving or sending data elements to external devices.

Figure 12:
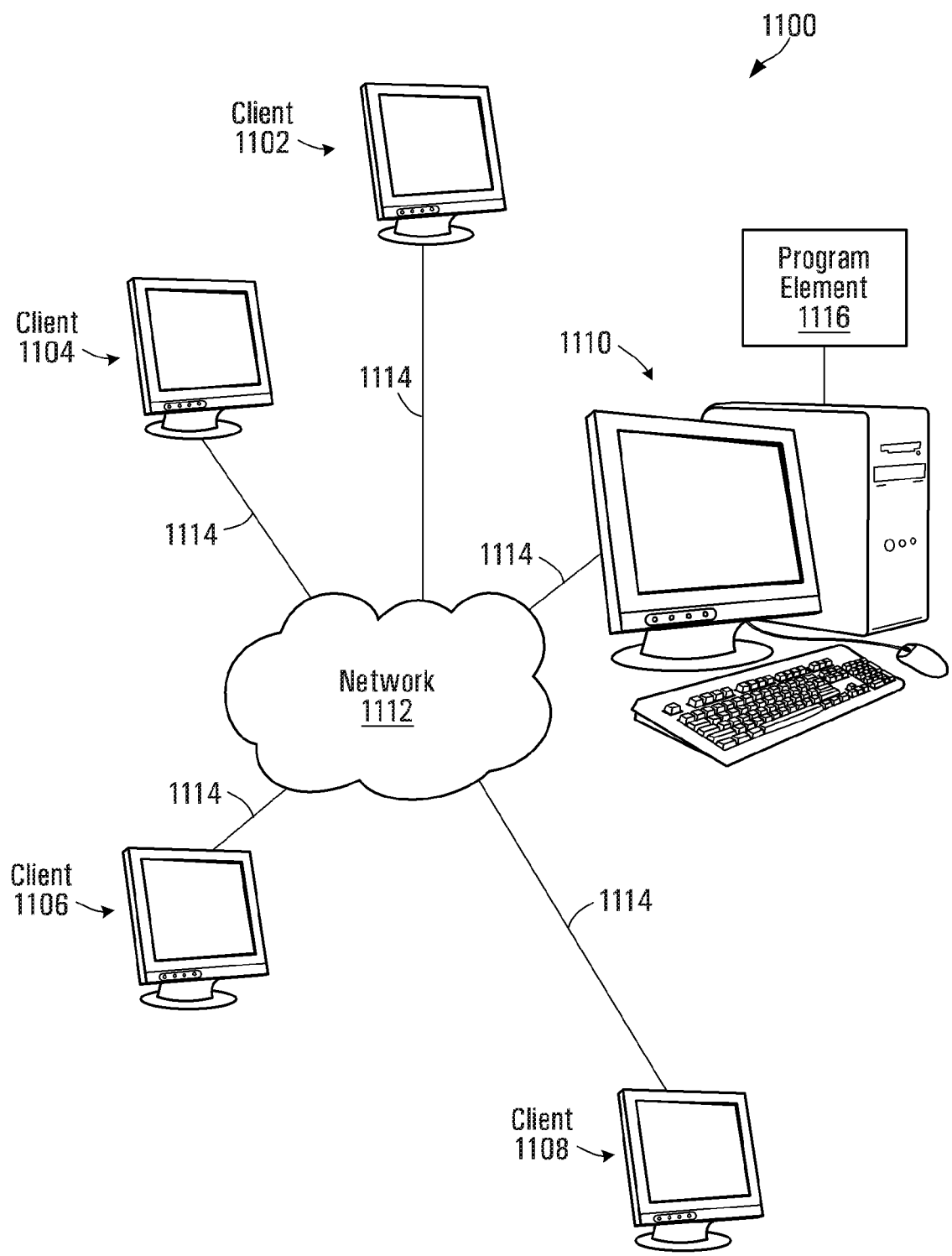
FIG. 12 shows a functional block diagram of a client-server system suitable for implementing a user interface for facilitating visual identification of prohibited objects in an image during security screening in accordance with an alternative specific example of implementation of the present invention.

It will be appreciated that the screening system 100 (depicted in FIG. 1) may also be of a distributed nature where the images of contents of receptacles are obtained at one location or more locations and transmitted over a network to a server unit implementing the method described above. The server unit may then transmit a signal for causing an output unit to display information to the user. The output unit may be located in the same location where the images of contents of receptacles were obtained or in the same location as the server unit or in yet another location. In a non-limiting implementation, the output unit is part of a centralized screening facility. FIG. 12 illustrates a network-based client-server system 1100 for system for screening receptacles. The client-server system 1100 includes a plurality of client systems 1102, 1104, 1106 and 1108 connected to a server system 1110 through network 1112. The communication links 1114 between the client systems 1102, 1104, 1106 and 1108 and the server system 1110 can be metallic conductors, optical fibers or wireless, without departing from the spirit of the invention. The network 1112 may be any suitable network including but not limited to a global public network such as the Internet, a private network and a wireless network. The server 1110 may be adapted to process and issue signals concurrently using suitable methods known in the computer related arts.

The server system 1110 includes a program element 1116 for execution by a CPU. Program element 1116 includes functionality to implement the methods described above, including a method for displaying information associated to a receptacle and for facilitating visual identification of a prohibited object in an image during security screening, and includes the necessary networking functionality to allow the server system 1110 to communicate with the client systems 1102, 1104, 1106 and 1108 over network 1112. In a specific implementation, the client systems 1102, 1104, 1106 and 1108 include display units responsive to signals received from the server system 1110 for displaying a user interface module implementation by the server system 1110.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A computer implemented method for facilitating visual identification of prohibited objects in images, said method comprising:
   a. providing a computer readable storage medium for storing a plurality of records, at least some of said records being associated with respective receptacles previously screened at a security checkpoint and including data conveying:
      i. an image of the contents of a receptacle derived from an apparatus that scans the receptacle with penetrating radiation;
      ii. threat assessment information derived using an automated threat detection processor;

b. using a processor in communication with said computer readable storage medium, processing records in said computer readable medium to display on a display device a first viewing space conveying a sequence of thumbnail images, the sequence of thumbnail images being associated with receptacles screened over a time period at the security checkpoint;

c. providing an input for enabling a user to enter selection information to select a receptacle amongst the receptacles screened at the security checkpoint over the time period by selecting a thumbnail image in the sequence of thumbnail images conveyed in the first viewing space;

d. using the processor, processing the selection information provided by the user and causing a second viewing space displayed concurrently with the first viewing space to convey an enhanced image of the selected receptacle, wherein the enhanced image is derived based on data in a record in the plurality of records associated with the selected thumbnail image and conveys threat assessment information associated with the selected receptacle.

2. A method as defined in claim 1, wherein the input provided for enabling the user to enter selection information is selected from the set consisting of a mouse, keyboard, pointing device, speech recognition unit and touch sensitive screen.

3. A method as defined in claim 1, said method including displaying a user operable control for enabling the user to modify the sequence of thumbnail images displayed in the first viewing space by modifying the time period.

4. A method as defined in claim 3, wherein said user operable control is a scrolling control.

5. A method as defined in claim 1, wherein at least some records in said plurality of records associated with respective previously screened receptacles include data conveying respective perceived threat levels associated with respective previously screened receptacles.

6. A method as defined in claim 1, wherein at least some records in said plurality of record associated with respective previously screened receptacles include respective time stamp data elements.

7. A method as defined in claim 1, wherein said method comprises deriving the enhanced image at least in part by processing data conveying an image of the selected receptacle based on threat assessment information in the record associated with the selected thumbnail image.

8. A method as defined in claim 7, wherein the threat assessment information in the record associated with the selected thumbnail image conveys an area of interest in the image of the selected receptacle potentially containing a prohibited object, said method comprising deriving the enhanced image at least in part by processing the data conveying the image of the selected receptacle to visually emphasize portions of the enhanced image inside the certain area of interest.

9. A method as defined in claim 7, wherein the threat assessment information in the record associated with the selected thumbnail image conveys an area of interest in the image of the selected receptacle potentially containing a prohibited object, said method comprising deriving the enhanced image at least in part by processing the data conveying the image of the selected receptacle to visually de-emphasize portions of the enhanced image outside the certain area of interest.

10. An apparatus for facilitating visual identification of prohibited objects in images, said apparatus comprising:

a. a memory suitable for storing a plurality of records associated with respective receptacles previously screened at a security checkpoint, at least some of said records including data conveying:
   i. an image of the contents of a receptacle derived from an apparatus that scans the receptacle with penetrating radiation;
   ii. threat assessment information derived using an automated threat detection processor;

b. a processing unit in communication with said memory unit, said processing unit being programmed for:
   i. displaying on a display device a first viewing space conveying a sequence of thumbnail images, the sequence of thumbnail images being associated with receptacles screened over a time period at the security checkpoint;
   ii. enabling a user to enter selection information to select a receptacle amongst the receptacles screened at the security checkpoint over the time period by selecting a thumbnail image in the sequence of thumbnail images conveyed in the first viewing space;
   iii. processing the selection information provided by the user and causing a second viewing space displayed concurrently with the first viewing space to convey an enhanced image of the selected receptacle, wherein the enhanced image is derived based on data in a record in the plurality of records associated with the selected thumbnail image and conveys threat assessment information associated with the selected receptacle.

11. An apparatus as defined in claim 10, wherein said processing unit is programmed for enabling the user to provide the selection information by using an input device selected from the set consisting of a mouse, keyboard, pointing device, speech recognition unit and touch sensitive screen.

12. An apparatus as defined in claim 10, wherein said processing unit is programmed for displaying a user operable control for enabling the user to modify the sequence of thumbnail images displayed in the first viewing space by modifying the time period.

13. An apparatus as defined in claim 12, wherein said user operable control is a scrolling control.

14. An apparatus as defined in claim 10, wherein at least some records in said plurality of records associated with respective previously screened receptacles include data conveying respective perceived threat levels associated with respective previously screened receptacles.

15. An apparatus as defined in claim 10, wherein at least some records in said plurality of records associated with respective previously screened receptacles include respective time stamp data elements.

16. An apparatus as defined in claim 10, wherein said processing unit is programmed for deriving the enhanced image at least in part by processing data conveying an image of the selected receptacle based on threat assessment information in the record associated with the selected thumbnail image.

17. An apparatus as defined in claim 16, wherein the threat assessment information in the record associated with the selected thumbnail image conveys an area of interest in the image of the selected receptacle potentially containing a prohibited object, said processing unit being programmed for deriving the enhanced image at least in part by processing the data conveying the image of the selected receptacle to visually emphasize portions of the enhanced image inside the certain area of interest.

18. An apparatus as defined in claim 16, wherein the threat assessment information in the record associated with the selected thumbnail image conveys an area of interest in the image of the selected receptacle potentially containing a prohibited object, said processing unit being programmed for deriving the enhanced image at least in part by processing the data conveying the image of the selected receptacle to visually de-emphasize wherein portions of the enhanced image outside the certain area of interest.

19. A non-transitory computer readable storage medium storing a program element suitable for execution by a CPU for implementing a system for facilitating visual identification of prohibited objects in images, said system comprising:
   a. a storage unit for storing a plurality of records associated with respective receptacles previously screened at a security checkpoint, at least some of said records including data conveying:
      i. an image of the contents of a receptacle derived from an apparatus that scans the receptacle with penetrating radiation;
      ii. threat assessment information derived using an automated threat detection processor;
   b. a functional module in communication with said storage unit, said functional module being programmed for:
      i. displaying on a display device a first viewing space conveying a sequence of thumbnail images, the sequence of thumbnail images being associated with receptacles screened over a time period at the security checkpoint;
      ii. enabling a user to enter selection information to select a receptacle amongst the receptacles screened at the security checkpoint over the time period by selecting a thumbnail image in the sequence of thumbnail images conveyed in the first viewing space;
      iii. processing the selection information provided by the user and causing a second viewing space displayed concurrently with the first viewing space to convey an enhanced image of the selected receptacle, wherein the enhanced image is derived based on data in a record in the plurality of records associated with the selected thumbnail image and conveys threat assessment information associated with the selected receptacle.

20. A method for facilitating visual identification of prohibited objects in images, said method comprising:
   a. displaying on a display device a first viewing space conveying a sequence of images of receptacles screened at a security checkpoint over a time period;
   b. providing a user operable control for enabling a user to provide selection information to select a receptacle amongst the receptacles screened at the security checkpoint over the time period by selecting an image in the sequence of images displayed in the first viewing space;
   c. processing the selection information provided by the user and causing a second viewing space displayed concurrently with the first viewing space to convey an enhanced image of the selected receptacle, wherein the enhanced image is derived at least in part based on data obtained by scanning the receptacle selected by the user using penetrating radiation and wherein the enhanced image conveys threat assessment information associated with the selected receptacle.

21. A method as defined in claim 20, wherein said control enables the user to provide selection information by using an input device selected from the set consisting of a mouse, keyboard, pointing device, speech recognition unit and touch sensitive screen.

22. A method as defined in claim 20, said method comprising displaying a user operable control for enabling the user to modify the sequence of images displayed in the first viewing space by modifying the time period.

23. A method as defined in claim 22, wherein said user operable control is a scrolling control.

24. A method as defined in claim 20, wherein the threat assessment information conveyed by the enhanced image is derived at least in part by using an automated threat detection processor.

25. A method as defined claim 24, wherein the threat assessment information includes an indication of an area of interest in the receptacle.

26. A method as defined in claim 20, wherein at least some images in said sequence of images are associated with respective level of risk data elements conveying a perceived threat level associated with corresponding receptacles.

27. A method as defined in claim 20, wherein at least some images in said sequence of images are associated with respective time stamp data elements.

28. An apparatus for facilitating visual identification of prohibited objects in images, said apparatus comprising a processing unit programmed for:
   a. displaying on a display device in communication with said processing unit a first viewing space conveying a sequence of images of receptacles screened at a security checkpoint over a time period;
   b. providing a user operable control for enabling a user to provide selection information to select a receptacle amongst the receptacles screened at the security checkpoint over the time period by selecting an image in the sequence of images displayed in the first viewing space;
   c. processing the selection information provided by the user and causing a second viewing space displayed concurrently with the first viewing space to convey an enhanced image of the selected receptacle, wherein the enhanced image is derived at least in part based on data obtained by scanning the receptacle selected by the user using penetrating radiation and wherein the enhanced image conveys threat assessment information associated with the selected receptacle.

29. A non-transitory computer readable storage medium storing a program element suitable for execution by a CPU, said program element implementing a system for facilitating visual identification of prohibited objects in images, said system being configured for:
   a. displaying on a display device a first viewing space conveying a sequence of images associated with receptacles screened at a security checkpoint;
   b. providing a user operable control for enabling a user to provide selection information to select a receptacle amongst the receptacles screened at the security checkpoint over the time period by selecting an image in the sequence of images displayed in the first viewing space;
   c. processing the selection information provided by the user and causing a second viewing space displayed concurrently with the first viewing space to convey an enhanced image of the selected receptacle, wherein the enhanced image is derived at least in part based on data obtained by scanning the receptacle selected by the user using penetrating radiation and wherein the enhanced image conveys threat assessment information associated with the selected receptacle.

* * * * *